(12) United States Patent
Cronch et al.

(10) Patent No.: US 12,061,363 B2
(45) Date of Patent: *Aug. 13, 2024

(54) CONFIGURABLE OPTICAL CONNECTOR

(71) Applicant: 3M INNOVATIVE PROPERTIES COMPANY, St. Paul, MN (US)

(72) Inventors: Daniel F. Cronch, Denver, CO (US); Sergio D. Carranza, Austin, TX (US); Boon K. Lee, Leander, TX (US); Michael A. Haase, St. Paul, MN (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 538 days.

This patent is subject to a terminal disclaimer.

(21) Appl. No.: 17/458,736

(22) Filed: Aug. 27, 2021

(65) Prior Publication Data

US 2021/0389527 A1 Dec. 16, 2021

Related U.S. Application Data

(63) Continuation of application No. 16/470,599, filed as application No. PCT/IB2017/058074 on Dec. 18, 2017, now Pat. No. 11,131,813.

(60) Provisional application No. 62/438,536, filed on Dec. 23, 2016.

(51) Int. Cl.
*G02B 6/38* (2006.01)

(52) U.S. Cl.
CPC ......... *G02B 6/3823* (2013.01); *G02B 6/3885* (2013.01)

(58) Field of Classification Search
CPC ...... G02B 6/381; G02B 6/383; G02B 6/3871; G02B 6/3875; G02B 6/3821; G02B 6/3885

USPC .................................. 385/53–55, 72, 76–78
See application file for complete search history.

(56) References Cited

U.S. PATENT DOCUMENTS

| | | |
|---|---|---|
| 6,789,953 B1 | 9/2004 | DeJong |
| 2002/0197046 A1 | 12/2002 | Tourne |
| 2015/0168654 A1 | 6/2015 | Hatcher |
| 2015/0293310 A1 | 10/2015 | Kanno |
| 2015/0346439 A1 | 12/2015 | Isenhour |

(Continued)

FOREIGN PATENT DOCUMENTS

| | | |
|---|---|---|
| JP | S59-123812 | 8/1984 |
| JP | 2008-191187 | 8/2008 |
| JP | 2013-054104 | 3/2013 |

(Continued)

*Primary Examiner* — Robert Tavlykaev
(74) *Attorney, Agent, or Firm* — Jonathan L. Tolstedt

(57) ABSTRACT

Each optical cable includes an array of at least one optical waveguide and at least one optical ferrule attached to the array of optical waveguides. The housing includes a first housing portion and a second housing portion engaged with the first housing portion. The second housing portion comprises at least one carrier and one frame. The carrier and frame of the second housing portion are configured to support the one or more optical cables. The first housing portion and the second housing portion are configured such that mechanical engagement of the first housing portion with the second housing portion moves the carrier relative to the frame. Movement of the carrier relative to the frame causes a bend in each optical waveguide and rotation of each ferrule. The bend provides a predetermined spring force of the optical waveguides at a predetermined angle of the ferrule.

19 Claims, 16 Drawing Sheets

(56) References Cited

U.S. PATENT DOCUMENTS

2016/0062056 A1 3/2016 Becker
2017/0059785 A1 3/2017 Smith

FOREIGN PATENT DOCUMENTS

| WO | 200070381 A1 | 11/2000 |
|----|--------------|---------|
| WO | WO 2007-70381 | 11/2000 |
| WO | WO 2014-055226 | 4/2014 |
| WO | WO 2015-142551 | 9/2015 |
| WO | WO 2017-066137 | 4/2017 |

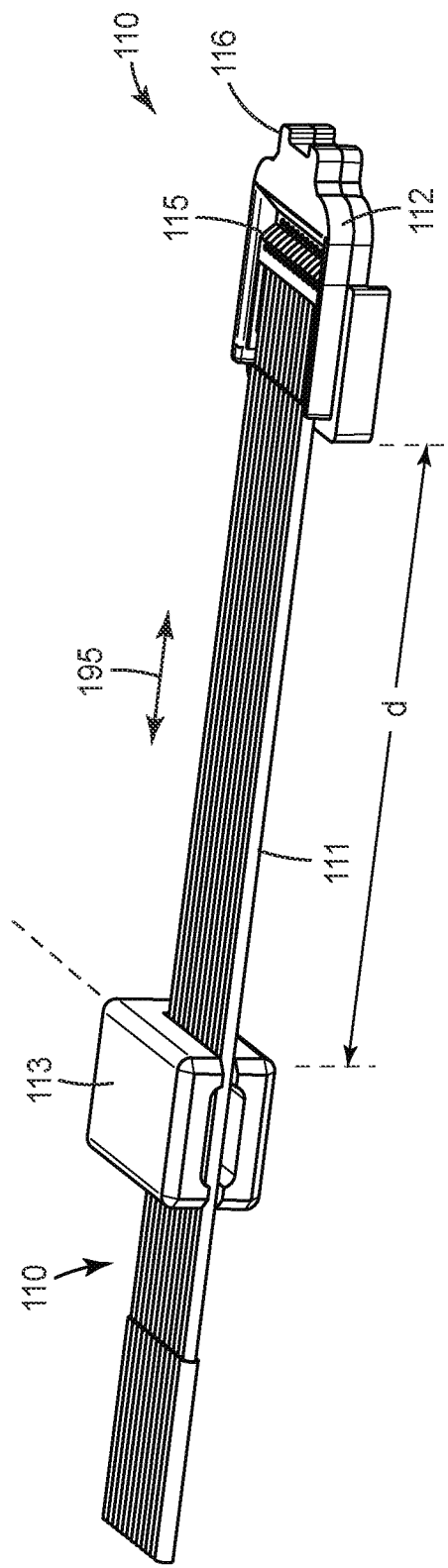
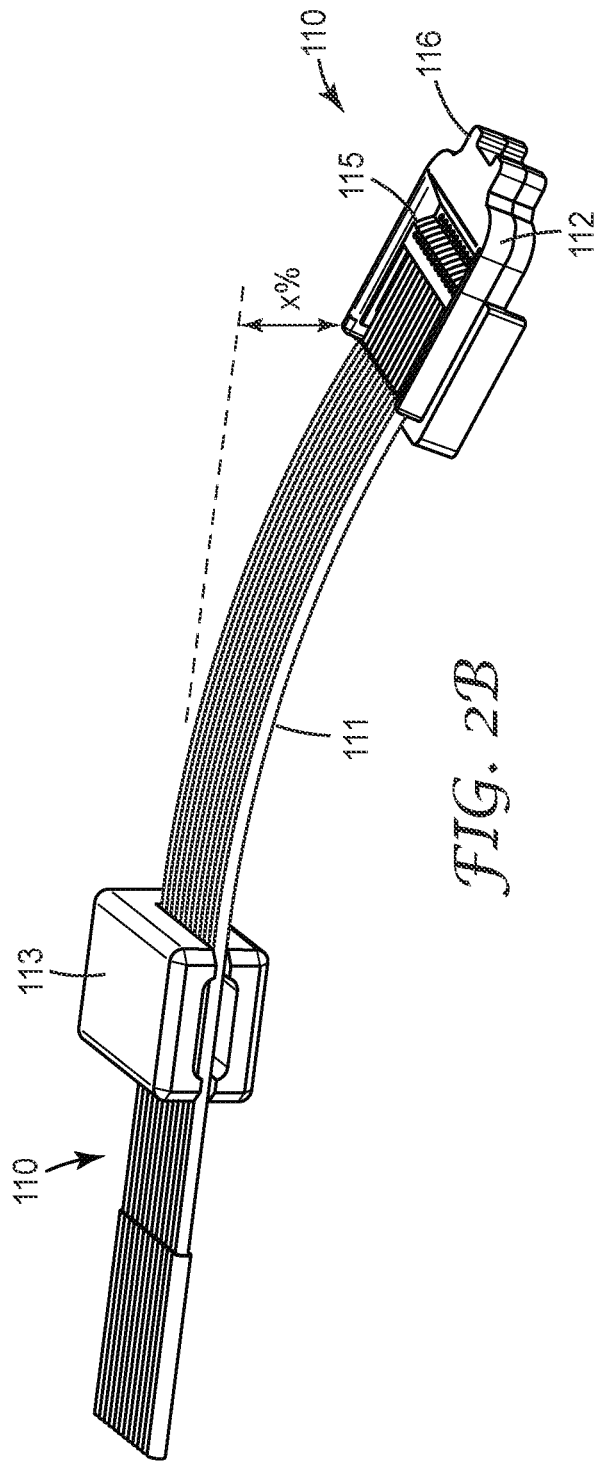
FIG. 2A
FIG. 2B

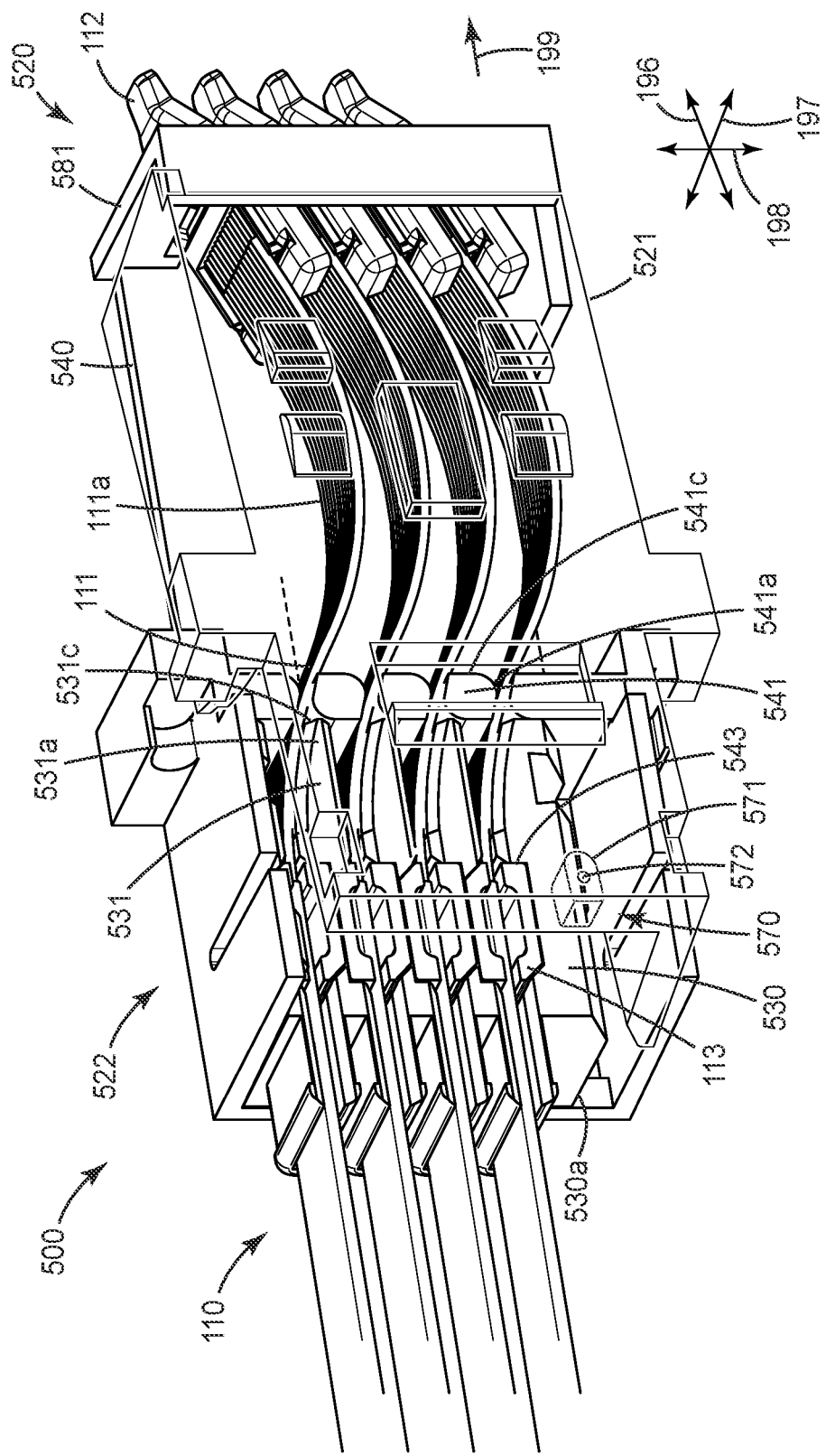

CONFIGURABLE OPTICAL CONNECTOR

TECHNICAL FIELD

This disclosure relates generally to optical connector assemblies and methods related to optical connector assemblies.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror. These expanded beam optical connectors can have non-contact optical coupling and require reduced mechanical precision when compared with conventional optical connectors.

BRIEF SUMMARY

Some embodiments are directed to an optical connector comprising one or more optical cables disposed within a housing. Each optical cable includes at least one optical waveguide and at least one optical ferrule attached to the optical waveguide. The housing includes a first housing portion and a second housing portion engaged with the first housing portion. The second housing portion comprises at least one carrier and one frame. The carrier and frame of the second housing portion are configured to support the one or more optical cables. The first housing portion and the second housing portion are configured such that mechanical engagement of the first housing portion with the second housing portion moves the carrier relative to the frame. Movement of the carrier relative to the frame causes a bend in each optical waveguide and rotation of each ferrule. The bend provides a predetermined spring force of the optical waveguide at a predetermined angle of the ferrule.

According to some embodiments, the optical connector as described above includes an actuator configured such that operation of the actuator causes relative motion between the carrier and the frame. The relative motion between the carrier and the frame causes the bend in the optical waveguide and rotation of the ferrule.

Some embodiments are directed to an optical connector that includes one or more optical cables and a housing. Each optical cable comprises at least one optical waveguide and at least one optical ferrule attached to the optical waveguide. The housing includes one or more waveguide support walls. Each waveguide support wall is configured to allow the optical cables to be inserted into the housing when waveguides of the optical cables are in a substantially straight configuration. Each waveguide support wall has a sloped surface to support the waveguides at a predetermined angle to a mating axis of the optical connector after the waveguides bend within the housing.

According to some embodiments, an optical connector includes one or more optical cables, each optical cable comprising at least one optical waveguide and at least one optical ferrule attached to the optical waveguide. The optical cables are disposed in a housing of the connector. The housing includes one or more waveguide support walls configured to support the optical cables. The one or more waveguide support walls are configured to allow the optical cables to be inserted into the housing along a direction substantially orthogonal to a mating axis of the optical connector.

Some embodiments are directed to an optical cable. The optical cable includes at least one optical waveguide having a longitudinal axis. At least one optical ferrule is attached to the optical waveguide. A cable retainer is attached to the optical waveguide and spaced apart from the ferrule. The optical cable is configured such that when the optical waveguide is held by the cable retainer so that the portion of the optical waveguide at the cable retainer is horizontally straight with respect to gravity, the portion of the optical waveguide at the ferrule sags by less than a predetermined percentage, x %, of a distance, d, between the cable retainer and the optical ferrule.

Some embodiments are directed to a method of assembling an optical connector. One or more optical cables are inserted into a housing comprising a carrier and frame. Each optical cable comprises at least one optical waveguide and at least one optical ferrule attached to the optical waveguide. An actuator is operated which causes relative movement between the carrier and the frame. In response to the relative movement between the carrier and the frame, the optical waveguide bends and the ferrule rotates. The bending of the optical waveguide provides a predetermined spring force at a predetermined angle of the ferrule.

BRIEF DESCRIPTION OF DRAWINGS

FIG. 2A depicts an optical cable that can be used in optical connectors in accordance with some embodiments;

FIG. 2B illustrates the gravitationally-induced bending (sag) of the optical cable of FIG. 2A when held horizontally and perpendicular to the force of gravity;

FIG. 5A shows a partially see through view of an optical connector in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Optical connectors described herein include one or more optical cable assemblies disposed in a housing. The optical cable assemblies may comprise one waveguide or arrays of multiple parallel waveguides (typically 4, 8 or 12 or more parallel waveguides) attached to one or more optical ferrules. Optical connectors described herein include use optical cable assemblies having waveguides that are bent. The bend in the waveguides provides a predetermined mating force for optical ferrules. Assembly of optical connectors that include bent optical waveguides can be simplified when the optical waveguides are inserted into the housing in a substantially straight or less bent configuration and the waveguides are subsequently bent or bent more within the housing after insertion. Embodiments described below involve connectors in which one more optical cables can be inserted into the connector housing in a substantially straight or less bent configuration. After insertion of the optical cables into the connector housing, the connector is configured by moving a first portion of the connector housing relative to a second portion or the connector housing. Movement of the first portion of the connector housing relative to the second portion of the connector housing causes the optical waveguides of the optical cables to bend and/or bend more and the optical ferrules attached to the optical waveguides to rotate. The bend in the optical waveguides provides a predetermined spring force of the optical waveguides at a predetermined angle of the ferrules.

Figure 1A:
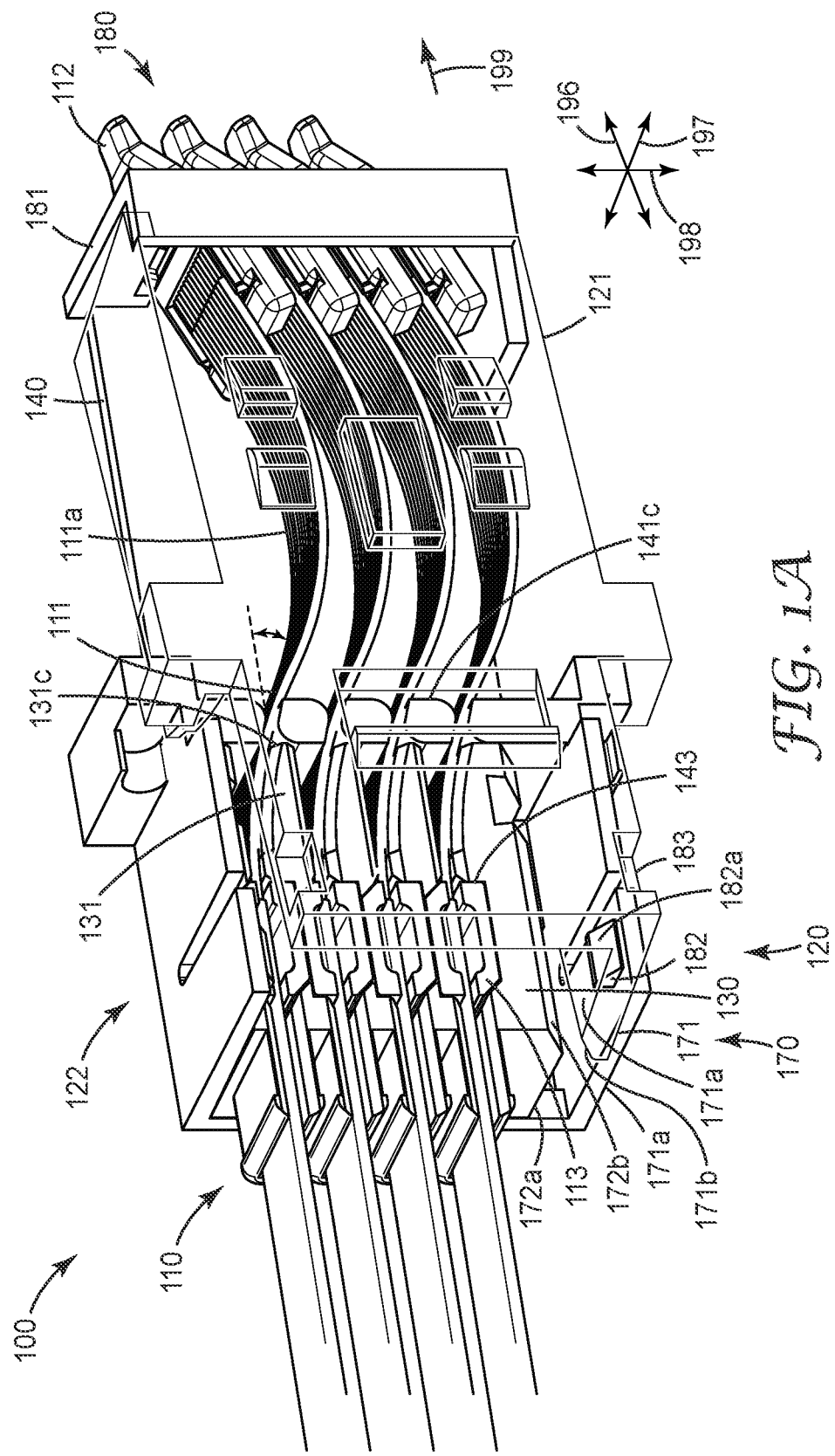
FIG. 1A shows an partially transparent perspective view of a connector comprising a first housing portion and a second housing portion after engagement of the first and second housing portions in accordance with some embodiments.
Figure 1B:
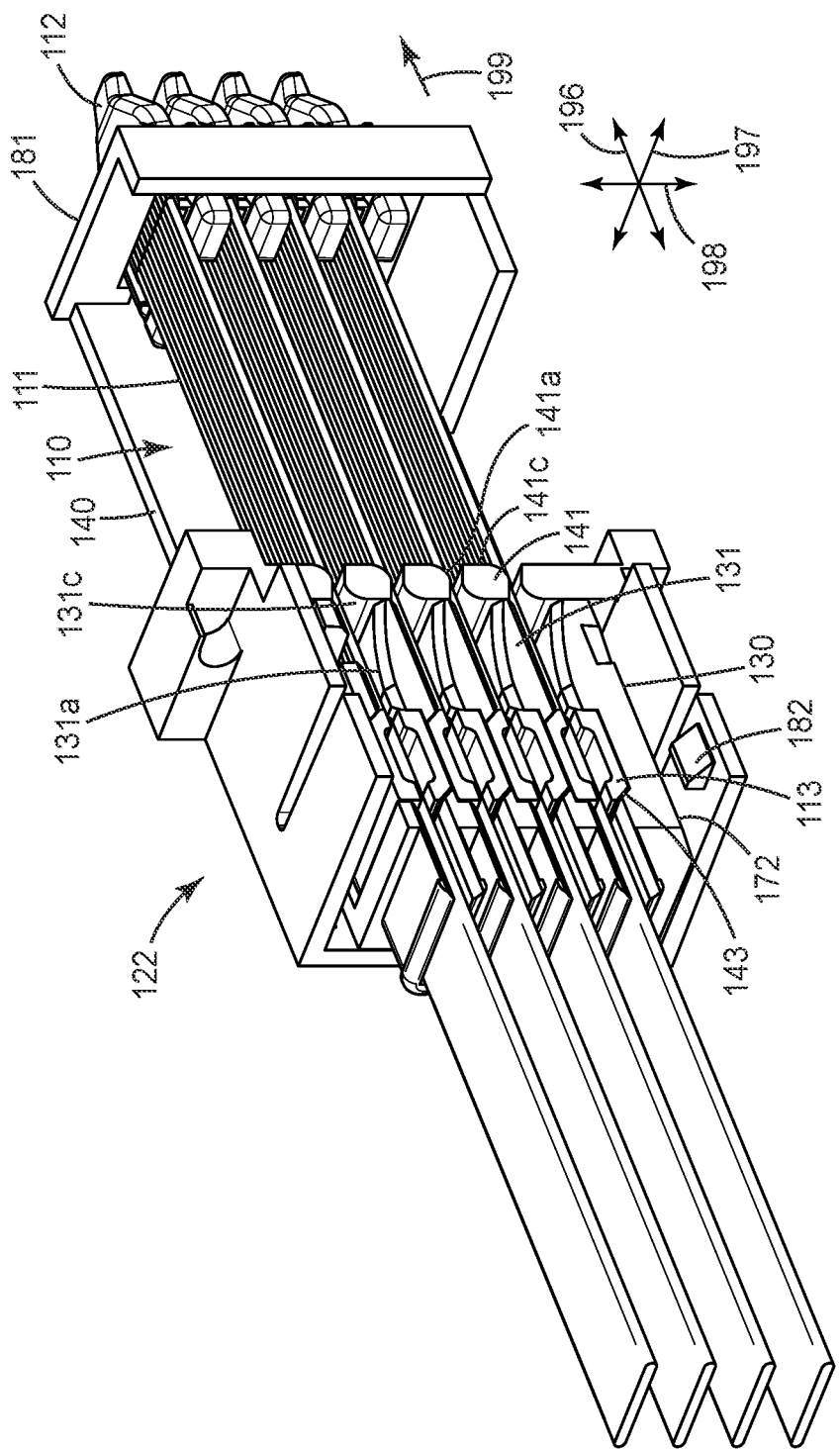
FIG. 1B shows the second housing portion of the connector of FIG. 1A.

FIGS. 1A-1G depict various aspects and components of an optical connector 100 in accordance with some embodiments. The connector 100 includes optical cables 110 disposed within a housing 120 and comprising a first housing portion 121 and a second housing portion 122 engaged with first housing portion 121. FIG. 1B shows the second housing portion 122. FIG. 1A shows a partially transparent perspective view of the connector 100 comprising the first 121 and second 122 housing portions after partial engagement.

The one or more optical cables 110 are disposed partially within the housing 120. Each optical cable 110 includes a waveguide array 111 comprising one or more optical waveguides attached to at least one optical ferrule 112. The optical waveguides may be optical fibers, e.g., single-mode fibers or multi-mode fibers, or planar waveguides disposed on a substrate. The individual waveguides of the waveguide array 111 are typically optical fibers made of glass with a protective buffer coating. Multiple parallel waveguides of a waveguide array 111 may be enclosed by a jacket.

In some embodiments, as shown in FIGS. 1A and 1B, an optical connector 100 includes four optical cables 110, wherein each optical cable assembly includes a waveguide array 111 comprising one or more waveguides and one optical ferrule 112. The connector 100 is shown oriented with respect to three orthogonal axes, longitudinal axis 196, lateral axis 197, and vertical axis 198, wherein the names of the axes are used for convenience and do not imply any specific orientation of the connector in space. The optical cables 110 generally extend in a direction along, or slightly skewed to, the mating axis 199 of the optical connector 100 and can be stacked within the housing 120 of the optical connector 100 along connector vertical axis 198 which is orthogonal to the mating axis 199.

FIG. 1B shows the second housing portion 122 which is configured to support the one or more optical cables 110. The second housing portion 122 includes a frame 140 and one or more carriers 130 that support the optical cables 110. The one or more carriers 130 and optical cables 110 are disposed at least partially within the frame 140. Although the connector 100 shown in FIG. 1B has one frame and one carrier 130, according to various embodiments, an optical connector may include one frame or multiple frames and/or may include one carrier or multiple carriers.

The view shown in FIG. 1B depicts the second portion 122 of the housing 120 prior to engagement with the first housing portion 121. The second housing portion 122 comprises a carrier 130 and frame 140 configured to support the optical cables 100. In FIG. 1B, the optical cables 110 have been inserted into the carrier 130 and frame 140 and are in a substantially straight configuration. The first housing portion 121 (see FIG. 1A) and the second housing portion 122 (see FIGS. 1A and 1B) are configured such that mechanical engagement of the first housing portion 121 with the second housing portion 122 moves the carrier 130 relative to the frame 140 along the axis 198. FIG. 1A shows a perspective view of the connector 100, including first housing portion 121 and the second housing portion 122, after engagement. The movement of the carrier 130 relative to the frame 140 causes a bend 111a in each optical waveguide of the waveguide array 111 and causes each ferrule 112 to rotate. The bend 111a provides a predetermined spring force of the optical waveguide array 111 at a predetermined angle of the ferrule 112.

The connector 100 includes multiple optical cables 110, each optical cable including at least one cable retainer 113. The cable retainer 113 is attached to the waveguide array 111 of the optical cable 110, e.g., by adhesive or friction grip, and is spaced apart from the ferrule 112. The second housing portion 122 comprises a carrier 130 that includes at least one retainer mount 143 configured to receive the cable retainer 113. As depicted in FIGS. 1A through 1G, the carrier 130 of the second housing portion 122 may include multiple retainer mounts 143 wherein each retainer mount 143 is configured to receive a corresponding cable retainer 113.

Figure 1C:
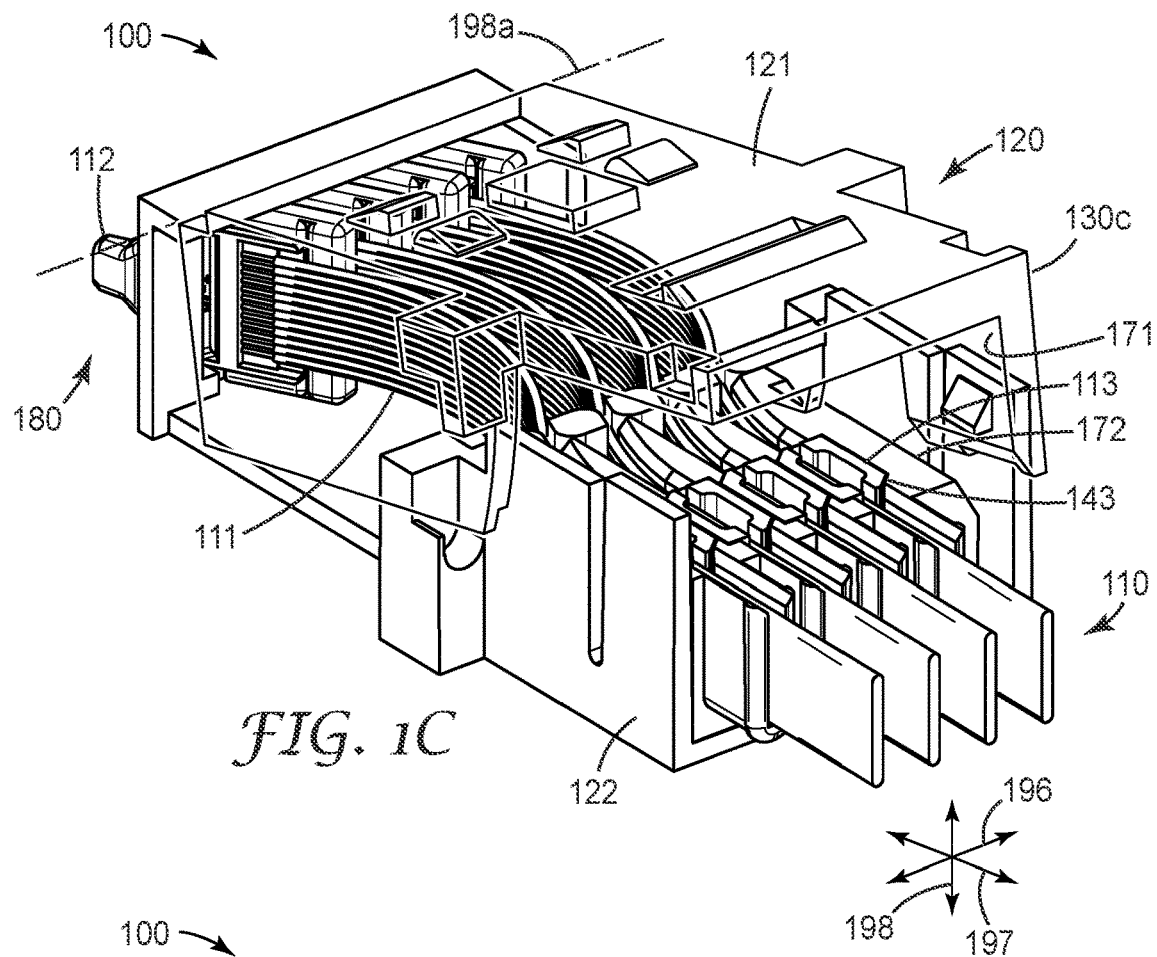
FIG. 1C is a perspective view of the connector of FIG. 1A during engagement of the first housing portion and the second housing portion.
Figure 1D:
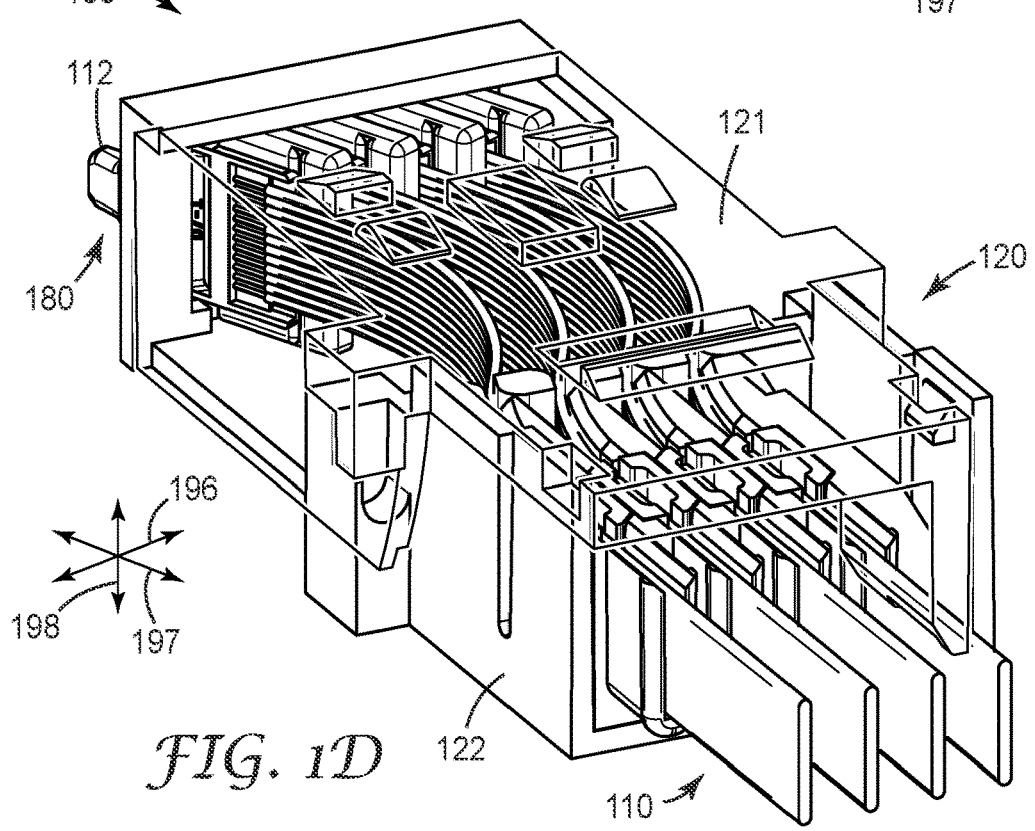
FIG. 1D is a perspective view of the connector of FIG. 1A after engagement of the first housing portion and the second housing portion of the connector of FIG. 1A.
Figure 1E:
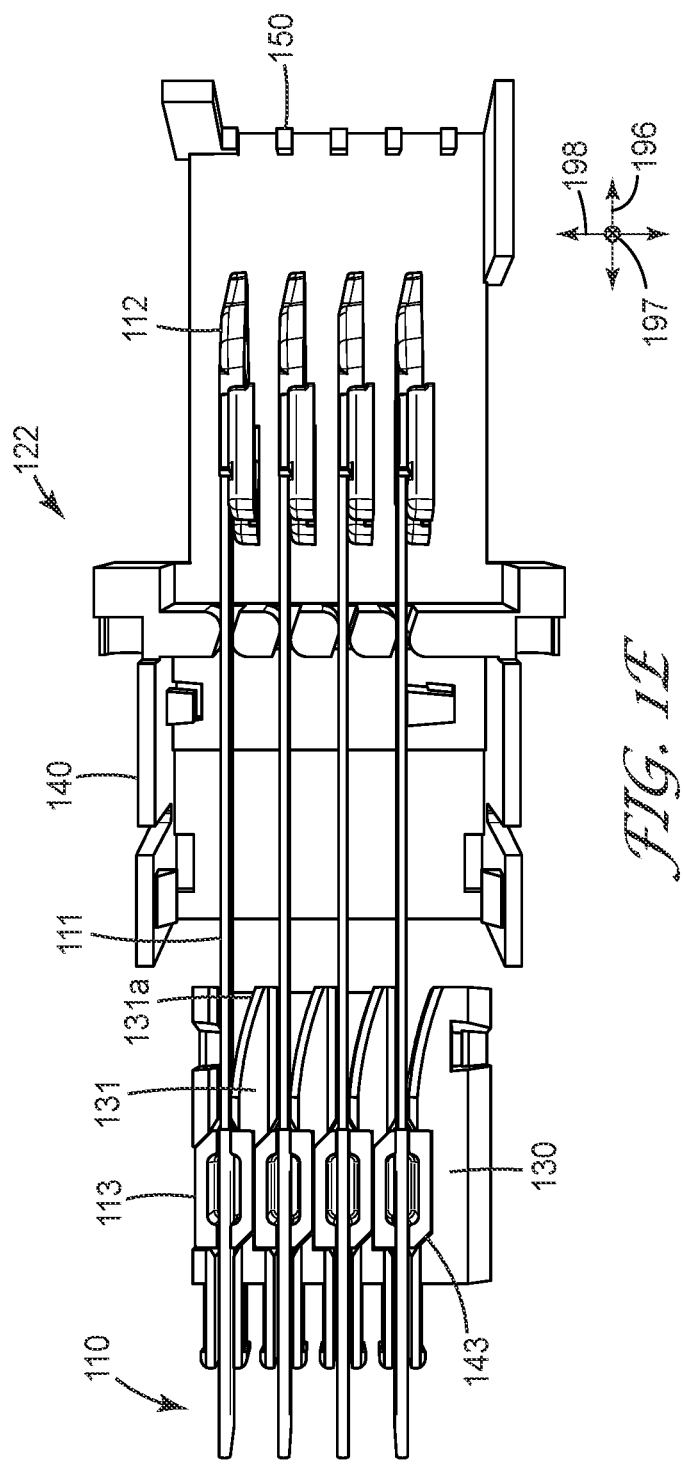
FIGS. 1E and 1F illustrate insertion of the optical cables into the second housing portion of the connector of FIG. 1A.
Figure 1F:
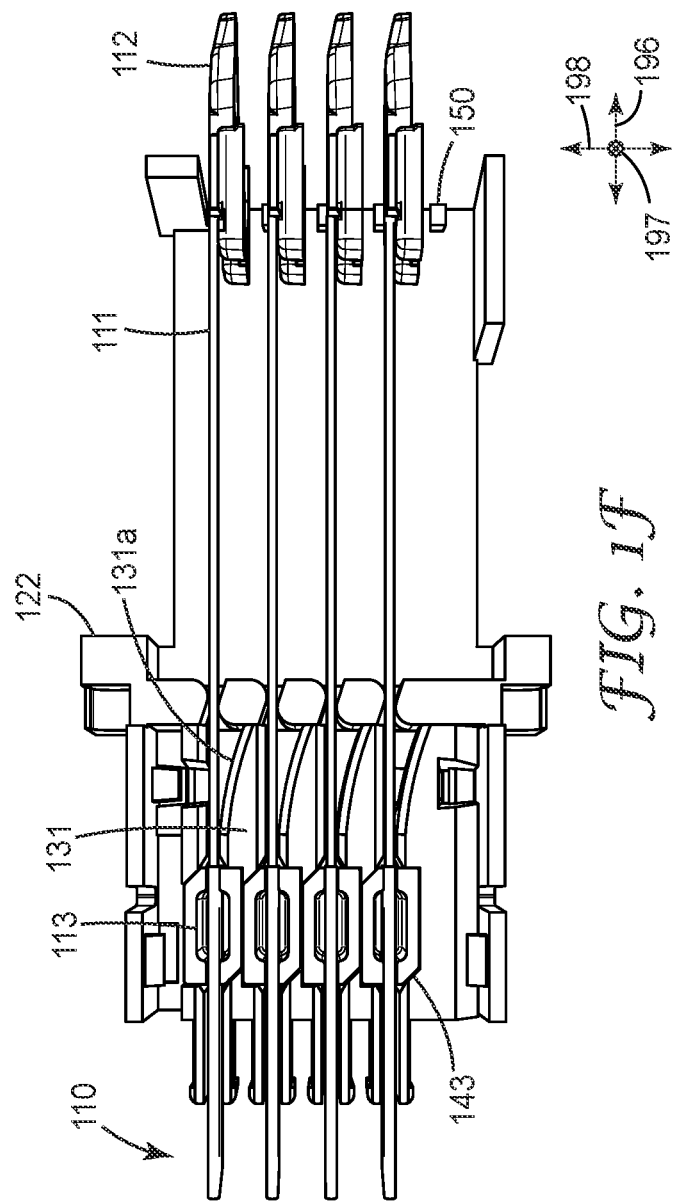
Figure 1G:
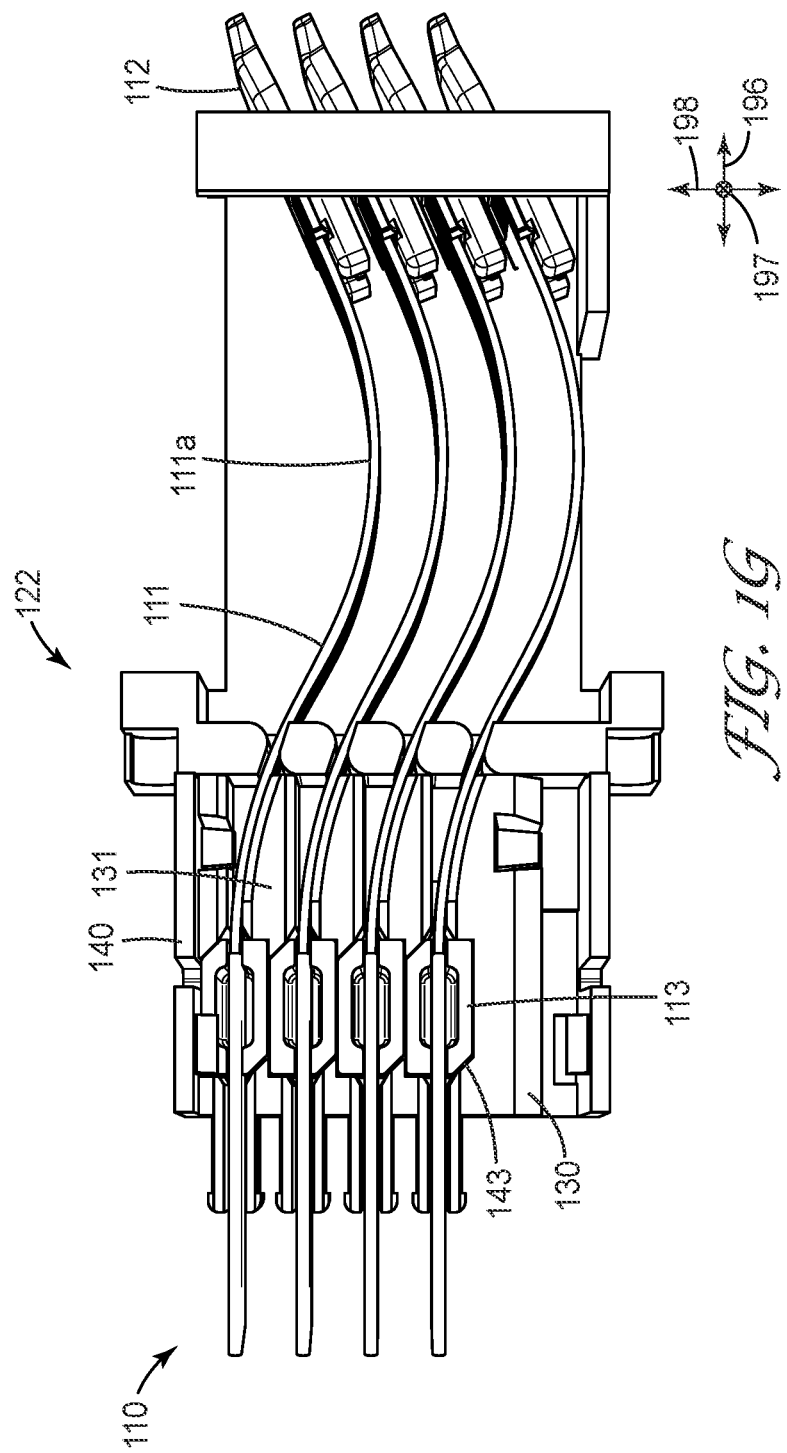
FIG. 1G illustrates the optical cables after engagement of the first and second housing portions of the connector of FIG. 1A.
Figure 2C:
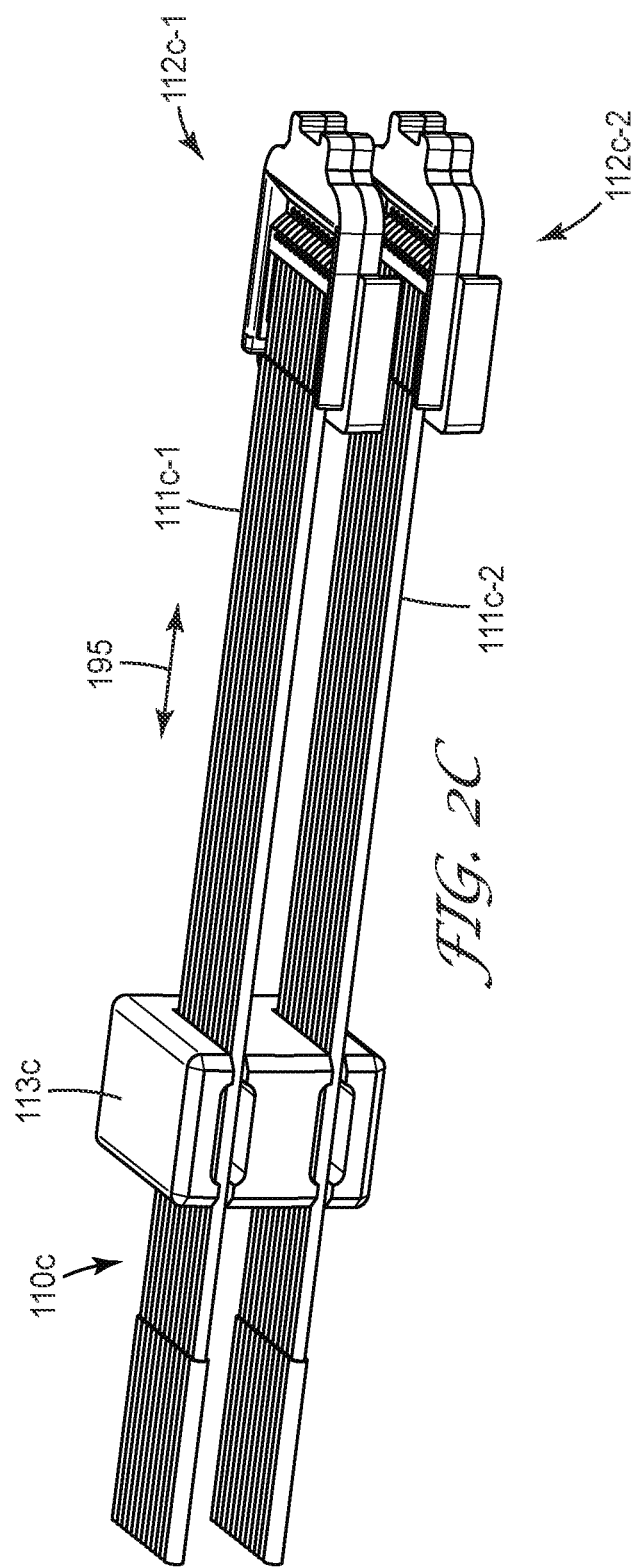
FIG. 2C illustrates an optical cable comprising one cable retainer attached to two sets of optical waveguides, each set of optical waveguides attached to a different ferrule in accordance with some embodiments.

The relationship between the number of cable retainers and the number of optical cables may be one-to-one as illustrated in FIGS. 1A through 1G. Alternatively, in some embodiments, the number of cable retainers may be less than the number of optical cables. For example, as illustrated in FIG. 2C one cable retainer 113c may be attached to two optical waveguide arrays 111c-1 and 111c-2, that are in turn attached to different ferrules 112c-1 and 112c-2, in accordance with some embodiments.

Referring again to the embodiment illustrated in FIGS. 1A through 1E, the frame 140 includes one or more ferrule supports 150 (see FIG. 1E) disposed at a mating end 180 of the optical connector 100. The ferrule supports 150 are configured to support the ferrules 112 of the optical cables 110. The frame 140 includes one or more frame waveguide support walls 141 disposed between a mating end 180 of the optical connector 100 and the carrier 130. Each frame waveguide support wall 141 is configured to support a corresponding optical waveguide array 111. The waveguide array may include one or more waveguides. As shown in FIG. 1B, each frame waveguide support wall 141 includes a sloped portion 141a that supports the optical waveguide 111 such that the optical waveguide 111 makes a predetermined angle θ with respect to a mating axis 199 of the optical connector 100. The predetermined angle θ may be between 15 and 25 degrees or about 18 degrees, for example.

As best seen in FIG. 1A, the carrier 130 may also include one or more carrier waveguide support walls 131 that are disposed between the mating end 180 of the optical connector and the retainer mount 143. Each carrier waveguide support wall 131 is configured to support a corresponding optical waveguide array 111. Each carrier waveguide support wall 131 can include a sloped surface 131a that supports the optical waveguide array 111 such that the optical waveguide array 111 makes a predetermined angle θ with respect to a mating axis 199 of the optical connector 100. The predetermined angle θ may be between 15 and 25 degrees or about 18 degrees, for example.

The connector 100 is assembled by first inserting the optical cables 110 into the carrier 130 and frame 140 of the second housing portion 122 in a substantially straight or less bent configuration. After insertion of the optical cables 110, the first 121 and second 122 housing portions are engaged. In the embodiment represented by FIGS. 1A through 1G, engagement of the first 121 and second 122 housing portions causes the carrier to move relative to the frame along the axis 198. The relative movement of the carrier 130 and frame 140 causes the optical waveguide array 111 to bend or bend more and causes the optical ferrules 112 to rotate. FIG. 1C is a perspective view of the connector 100 during engagement of the first housing portion 121 and the second housing portion 122. FIG. 1D is a perspective view of the connector 100 after engagement of the first housing portion 121 and the second housing portion 122. FIGS. 1E and 1F illustrate insertion of the optical cables 110 into the second housing portion 122. FIG. 1G illustrates the optical cables 110 after engagement of the first 121 and second 122 housing portions.

As best seen in FIGS. 1E and 1F, before engagement of the first 121 and second 122 housing portions the carrier 130 and the frame 140 are adapted to allow the optical cables 110 to be installed in and subsequently removed from the carrier 130 and the frame 140 without damage to the second housing portion 122, including the carrier 130 and frame 140, and/or the optical cables 110. The optical cables 110 can be inserted into the carrier 130 and the frame 140 before engagement of the first housing portion 121 and the second housing portion 122 while waveguide array 111 of the optical cables 110 is substantially straight or slightly bent. The assembly of the connector 100 includes configuring the connector. Configuring the connector includes the operation that causes the waveguide array 111 to bend or bend more and causes the ferrules 112 to rotate. For the connector 100 shown in FIGS. 1A through 1G, configuration of the connector occurs when the first and second housing portions are engaged. Engagement of the first and second housing portions causes the carrier 130 to move relative to the frame 140. The relative movement causes the waveguide array 111 to bend or to bend more, as depicted in FIG. 1G.

The optical cables 110 may be inserted into the carrier and frame along one or more insertion axes. Referring to FIGS. 1E and 1F, in some configurations the optical cables 110 are inserted into the carrier 130 and the frame 140 of the second housing portion 122 along at least a first insertion axis. In some configurations, the optical cables 110 are inserted into the carrier 130 and frame 140 of the second housing portion 122 along first, seconds, and/or third orthogonal insertion axes.

In the embodiment shown in FIGS. 1E and 1F, the optical cable assemblies are inserted into carrier 130 and frame 140 along first and second insertion axes that are orthogonal to one another. The first insertion axis, e.g., connector lateral axis 197, is substantially orthogonal to the mating axis 199 of the optical connector 100. The second insertion axis, e.g., connector longitudinal axis 196, is substantially parallel to the mating axis 199 and is orthogonal to the lateral axis 197. Insertion of the optical cables 110 along the lateral axis 197 (first insertion axis) and the longitudinal axis 196 (second insertion axis) causes the ferrules 112 of the optical cables 110 to be inserted between the ferrule supports 150 of the frame 140 and causes the cable retainers 113 to be inserted into the retainer mounts 143 of the carrier 130 as shown in FIG. 1F.

In the embodiment illustrated in FIGS. 1A through 1G, the first and second housing portions 121, 122 are engaged after the optical cables 110 are inserted in the second connector housing portion 122. Installation of the optical cables 110 involves insertion of the optical cables 110 along the lateral and longitudinal axes 197, 196 (first and second insertion axes) as described above. As illustrated in FIGS. 1C and 1D, engagement of the first 121 and second 122 housing portions involves relative movement between the first housing portion 121 and the second housing portion 122 along at least a first engagement axis. As shown in FIG. 1C, the engagement of the first and second housing portions can involve movement along the lateral axis 197 that is substantially perpendicular to the mating axis 199 in some embodiments. As further shown in FIG. 1C, in some embodiments, mechanical engagement of the first housing portion 121 and the second housing portion 122 may involve relative rotational movement of the first 121 and second 122 housing portions. For example, the rotational movement can involve rotation around a rotational axis 198a (see FIG. 1C) that is substantially parallel to axis 198. The rotational axis 198a may be substantially orthogonal to the mating axis 199, as depicted in FIG. 1C. In other embodiments, the rotational axis may be substantially parallel to the mating axis 199, for example.

In the connector illustrated in FIGS. 1A through 1G, the first housing portion 121 and the second housing portion 122 are configured such that the mechanical engagement of the first housing portion 121 with the second housing portion 122 (see FIG. 1C and FIG. 1G) causes the carrier 130 to move relative to the frame 140 along a configuration axis, e.g., connector vertical axis 198, shown in FIG. 1G. In the embodiment illustrated in FIGS. 1E through 1G, the axis 198 (configuration axis) is substantially perpendicular to the mating axis 199 of the optical connector 100 and is also substantially perpendicular to the lateral axis 197. Movement of the carrier 130 relative to the frame 140 along the vertical (configuration) axis 198 causes the waveguide array 111 of the optical cables 110 to bend or bend more from their initial position following insertion and causes the ferrules 112 attached to the waveguide array 111 to rotate.

FIG. 2A depicts the optical cable 110 that can be used in optical connectors in accordance with some embodiments. The optical cable 110 comprises an array of one or optical waveguides 111 that extend along a waveguide longitudinal axis 195. At least one optical ferrule 112 is attached each optical waveguide array 111 and a cable retainer 113 is attached to the optical waveguide array 111 spaced apart from the ferrule 112. As illustrated in FIG. 2B, when the optical cable 110 is supported and held horizontally straight with respect to the force of gravity by the cable retainer 113, the optical waveguide 111 sags from the horizontal by less than a predetermined percentage, x %, of the distance, d, between the cable retainer 113 and the optical ferrule 112. Suitable values for x % may be in a range between about 20% and about 1%. For example, values for x % may be about 20%, about 10%, about 5%, or about 1%. The distance, d, may be about 4 cm or about 1.8 cm in some embodiments. Additional information regarding cable retainers and retainer mounts and optical connectors that incorporate retainers and mounts is discussed in commonly owned U.S. patent application Ser. No. 62/240,008 filed on Oct. 12, 2015 which is incorporated herein by reference. As previously discussed, the optical waveguide array 111 may comprise one optical fiber or multiple optical fibers. The at least one optical waveguide array 111 can comprise at least one planar waveguide disposed on a substrate or multiple planar waveguides disposed on a substrate. The term optical waveguide is used herein to refer to an optical element that propagates signal light. An optical waveguide comprises at least one core with a cladding, wherein the core and cladding are configured to propagate light, e.g., by total internal reflection. An optical waveguide may be, for example, a single or multi-mode waveguide, a single core fiber, a multi-core optical fiber, or a polymeric waveguide. A waveguide may have any suitable cross sectional shape, e.g., circular, square, rectangular etc.

The ferrule 112 is configured to mate, e.g., hermaphroditically, with another ferrule. The ferrule 112 illustrated in FIGS. 2A and 2B includes a mechanical mating tongue 116 and light redirecting member 115. In some embodiments, the mechanical mating tongue 116 can have a tapering width along at least a portion of a length of the tongue portion as shown in the illustrations. The mechanical mating tongue 116 can extend outwardly from a front of a connector housing (not shown in FIGS. 2A and 2B).

In some embodiments, multiple waveguide arrays may be attached to a single cable retainer. FIG. 2C illustrates a cable retainer 113c attached to multiple waveguide arrays 111c-1, 111c-2 that are shown extending along the waveguide longitudinal axis 195. FIG. 2C shows the first waveguide array 111c-1 attached to ferrule 112c-1 and the second waveguide array 111c-2 attached to a second ferrule 112c-2. Each of the first and second waveguide arrays 111c-1, 111c-2 are attached to a single cable retainer 113c.

Figure 2D:
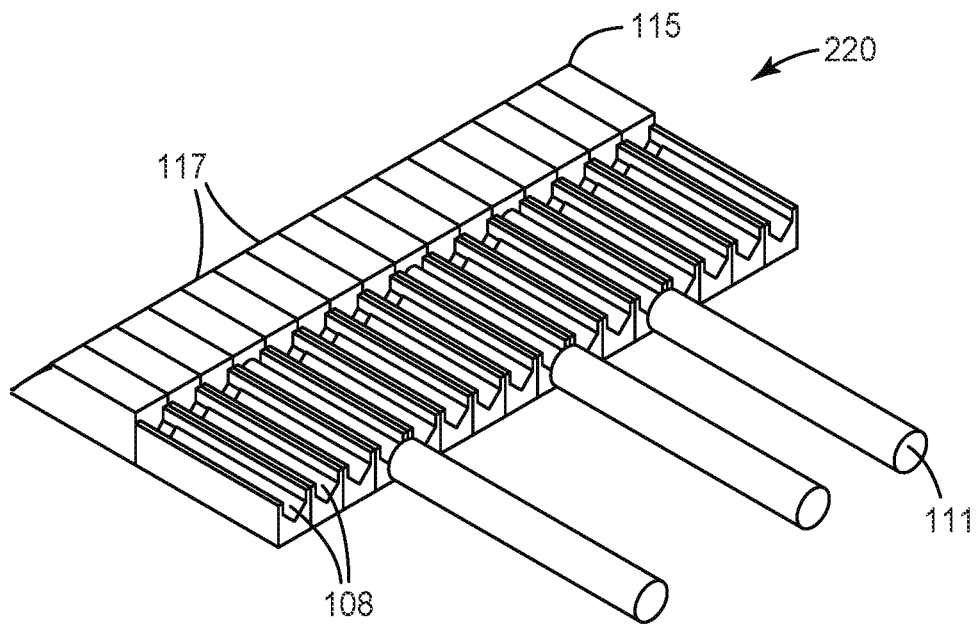
FIG. 2D is a cutaway view of a portion of a ferrule focusing on the light redirecting member of the ferrule in accordance with some embodiments.

FIG. 2D is a cutaway view of a portion of a ferrule 112 focusing on the light redirecting member. FIG. 2D illustrates the attachment of several optical waveguides or a waveguide array 111 to ferrule portion 220. Optical waveguides 111 are aligned in grooves 108 to which they are permanently attached. At the point of attachment, the fiber buffer coating and protective jacket (if any) of the waveguides 111 has been stripped away to allow only the bare optical fibers to lie aligned and permanently affixed to grooves 108. The exit ends of optical waveguides in array 111 are situated so as to be able to direct light emanating from each optical waveguide in the optical waveguide array 111 into the input side or face of corresponding light redirecting member 115. Ferrule portion 220 includes an array of light redirecting elements 117, at least one for each optical waveguide in the waveguide array 111 attached to ferrule 112. For example, in various embodiments each light redirecting element 115 comprises one or more of a prism, a lens, and a reflecting surface. Ferrule portion 220 includes an array of light redirecting elements 117, one for each optical waveguide of the optical waveguide (optical fiber) array 111

Figure 2E:
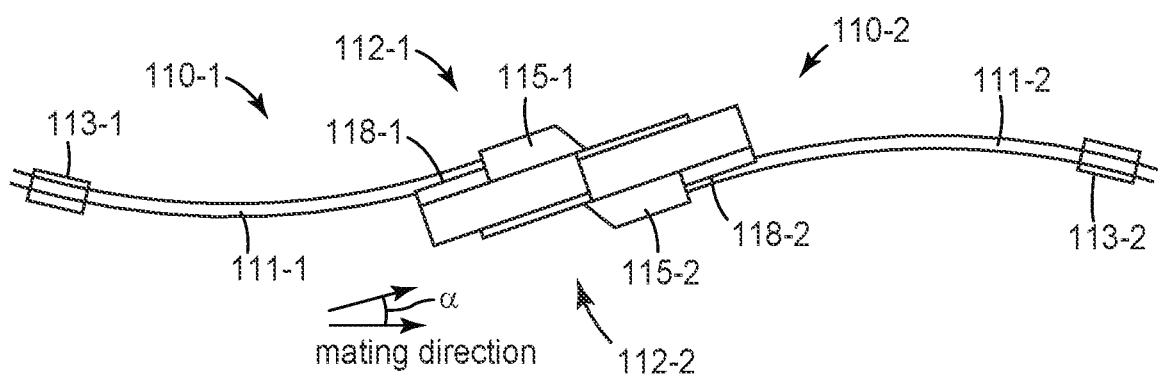
FIG. 2E illustrates a side view of two optical cables showing mated ferrules in accordance with some embodiments.

FIG. 2E illustrates a side view of two optical cables 110-1 and 110-2 showing mated ferrules 112-1, 112-2 having light coupling members 115-1 and 115-2 and attached to optical waveguide arrays 111-1, 111-2 at light coupling unit attachment areas 118-1, 118-2. A cable retainer 113-1, 113-2 is attached to the optical waveguide arrays 111-1, 111-2. The ferrules 112-1, 112-2 may be oriented at a predetermined mating angle, □, with respect to a mating direction. A bend in the optical waveguide arrays 111-1, 111-2 between the light coupling unit attachment area 118-1, 118-2 and the cable retainer 113-1, 113-2 provides a predetermined amount of spring force to maintain the ferrules 112-1, 112-2 in the mated position.

Additional information regarding features and operation of light coupling units, optical cables and optical connectors is discussed in commonly owned U.S. patent application Ser. No. 61/710,077 filed on Oct. 5, 2012 which is incorporated herein by reference in its entirety.

Figure 3A:
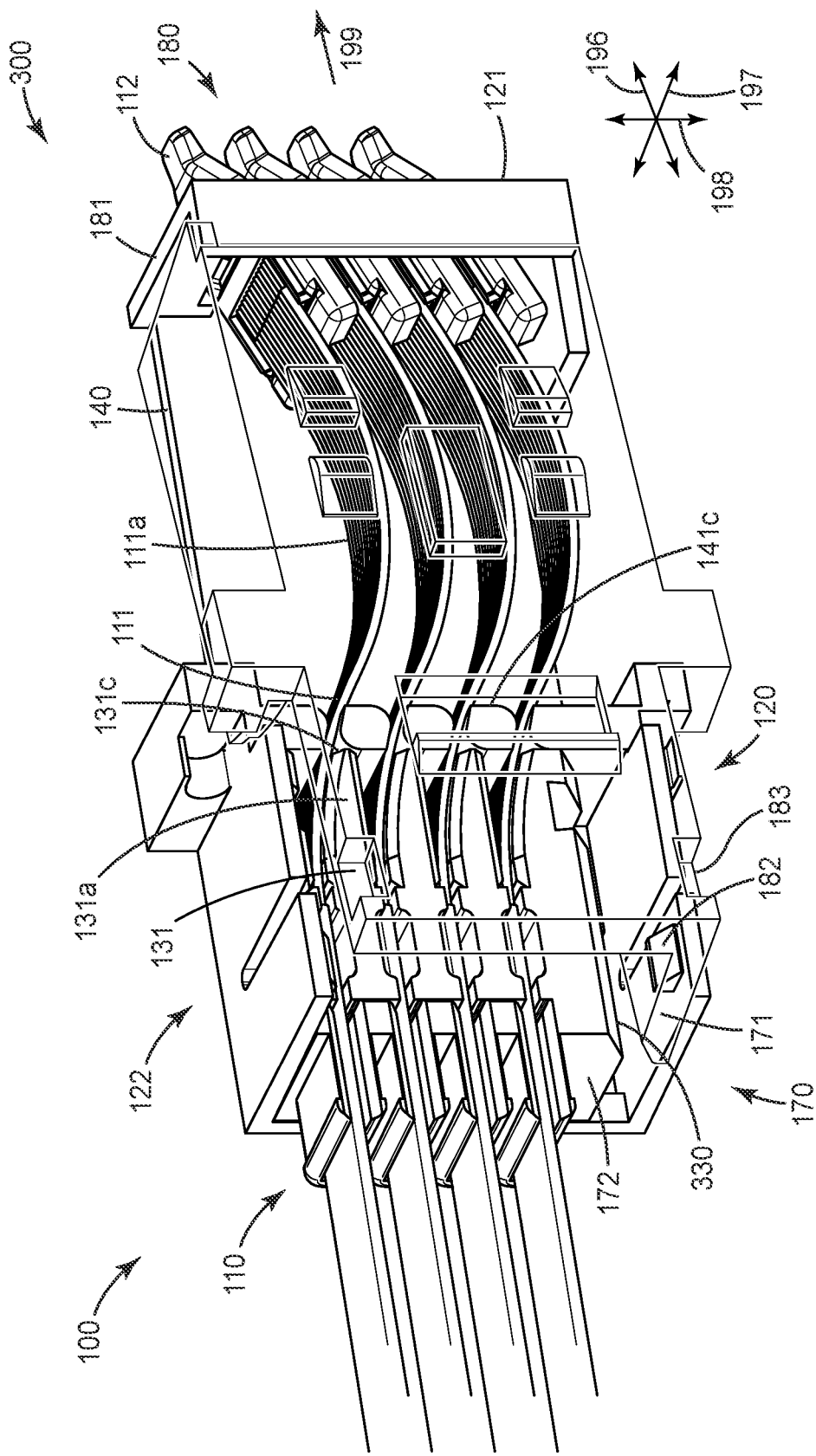
FIG. 3A illustrates an optical connector having a monolithic carrier in accordance with some embodiments.
Figure 3B:
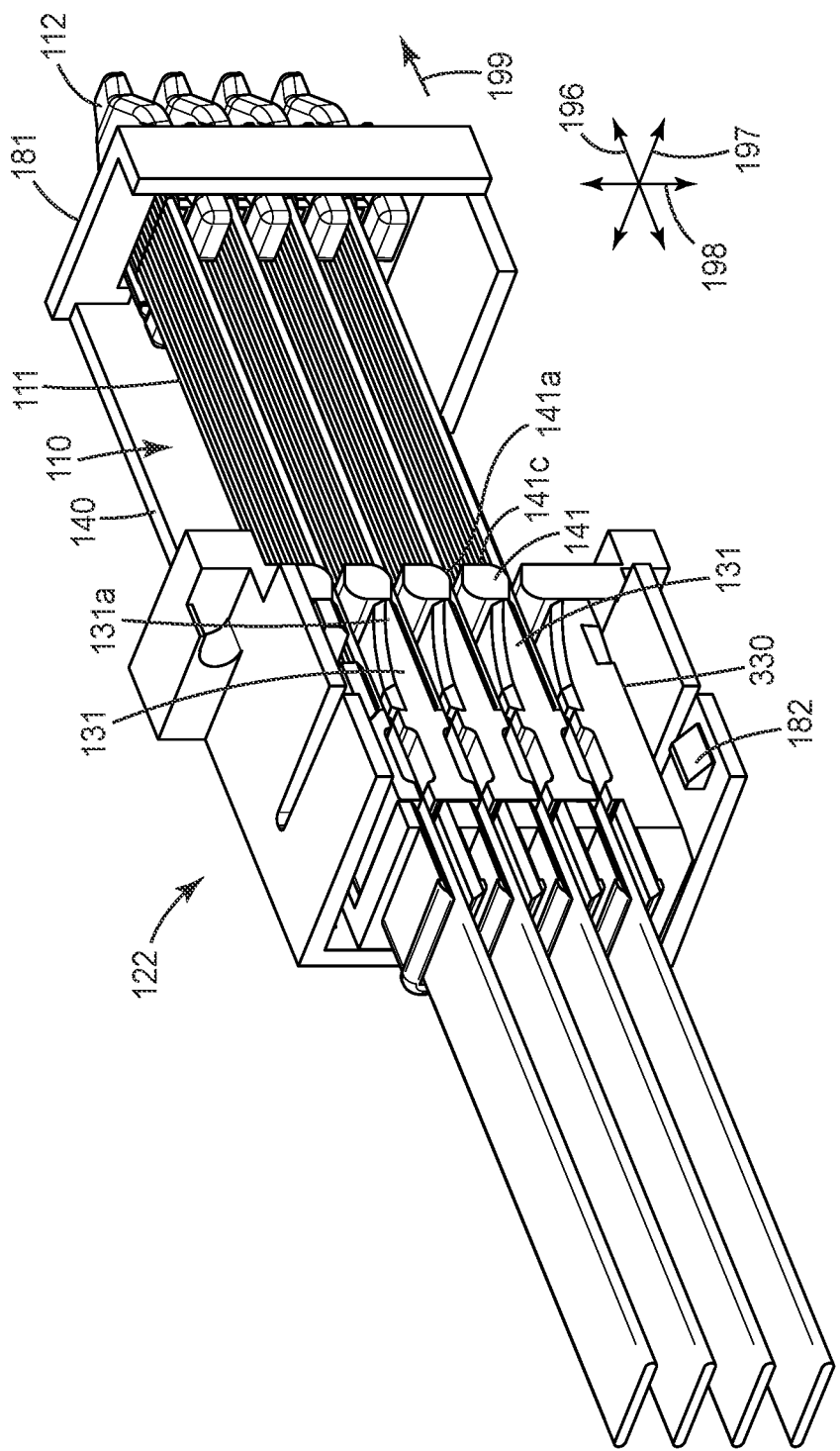
FIG. 3B shows the second housing portion of the connector of FIG. 3A.

FIGS. 3A and 3B illustrate an optical connector 300 that is similar in many respects to the optical connector 100 shown in FIGS. 1A through 1G. Optical connector 300 differs from connector 100 in that connector 300 includes a monolithic carrier 330 and does not include separate cable retainers and retainer mounts as shown in FIGS. 1A through 1G. The monolithic carrier 330 can be attached directly to the waveguide arrays 111, e.g., by adhesive or frictionf grip.

The connectors 100 and 300 shown in FIGS. 1A through 1G and FIGS. 3A and 3B, respectively, include an actuator 170 that configures the connector after the optical cable assemblies are inserted into the housing. Operation of the actuator 170 causes relative motion between the carrier 130, 330 and the frame 140, along axis 198 (the configuration axis). The relative motion between the carrier 130, 330 and the frame 140 along axis 198 causes a bend 111a in the waveguide array 111 of the optical cable 110 and causes the ferrules 112 to rotate. The bend 111a in the waveguide array 111 provides a predetermined about of spring force of the waveguide array 111 at a predetermined angle of the ferrules 112 with respect to the mating axis 199 of the connector 100, 300.

According to some implementations, the actuator 170 is configured such that operation of the actuator 170 occurs when the first housing portion 121 mechanically engages with the second housing portion 122. As best seen in FIGS. 1A-1C, in some embodiments the actuator 170 comprises an actuator rib 171 of the first housing portion 121 and a carrier surface 172 of the carrier 130. The actuator rib 171 comprises a first rib surface 171a and an angled rib surface 171b. The carrier surface 172 comprising a first carrier surface 172a and an angled carrier surface 172b. The angled surface of the rib 171b is complementary to the angled actuator surface 172b. When the connector 100 is oriented as shown in FIG. 1A, surfaces 171a, 171b of the rib 171 are configured to interact with the actuator surfaces 172a, 172b. The surfaces 171a, 171b apply a force to the surfaces 172a, 172b, pushing the carrier 130 up along axis 198 (configuration axis) relative to the frame 140.

As shown in FIG. 1A, the second housing portion 122 may include a retaining clip 182 having a ramped surface 182a. The retaining clip 182 is configured to engage with a mating feature 183 of the first housing portion 121. Engagement of the retaining clip 182 and the mating feature 183 holds the first housing portion 121 and second housing portions 122 together after they are fully engaged.

Figure 4A:
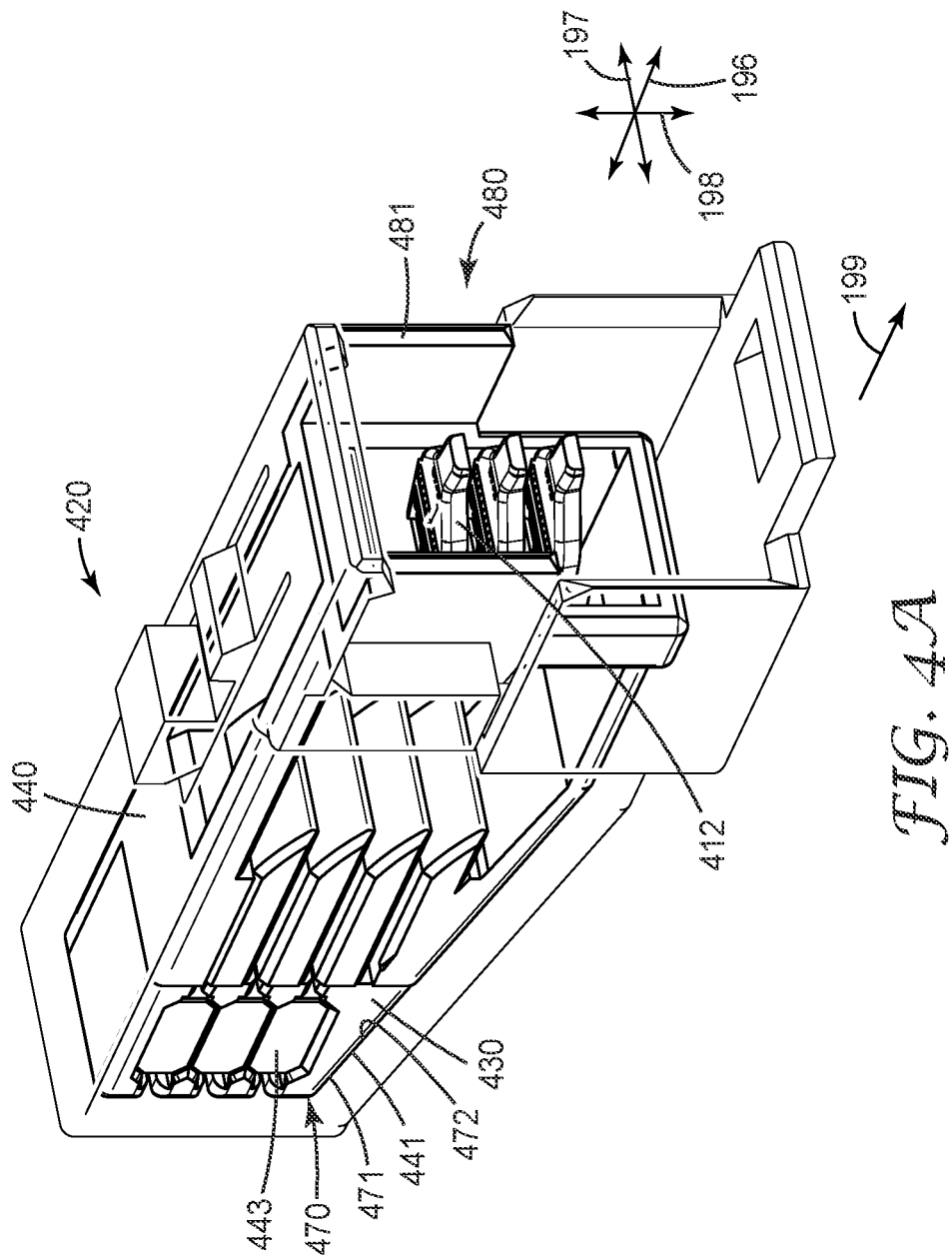
FIG. 4A is a perspective view of an optical connector in accordance with some embodiments.
Figure 4B:
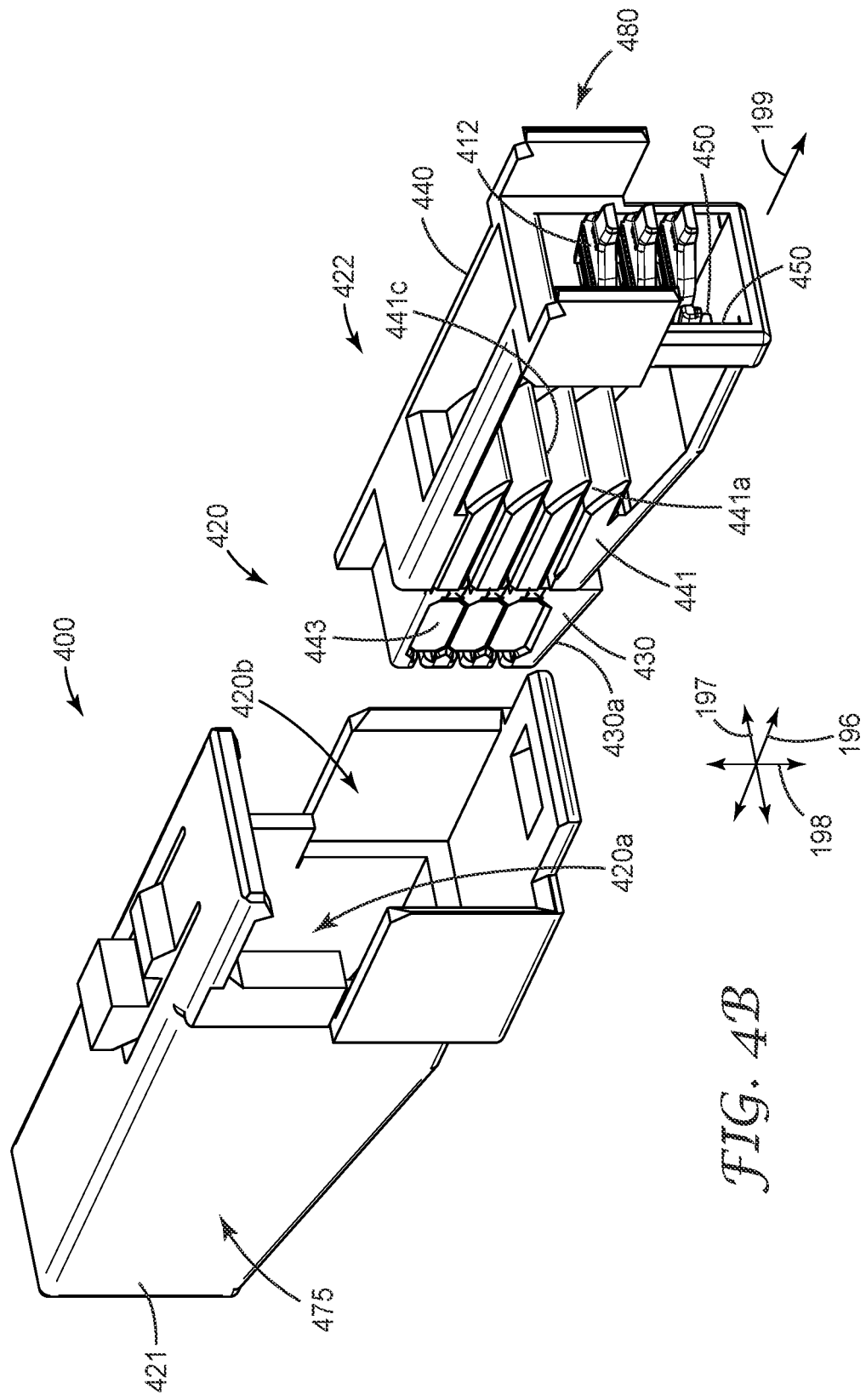
FIG. 4B is a partially see-through view of the first and second housing portions of the connector of FIG. 4A.

FIG. 4A is a see-through perspective view of the housing 420 illustrating first 421 and second 422 housing portions that are fully engaged. FIG. 4B is an exploded perspective view of connector 400 comprising a housing 420 that includes first 421 and second 422 housing portions. The second housing portion 422 includes a carrier 430 and frame 440 wherein the carrier 430 and frame 440 are configured to move relative to one another during mechanical engagement of the first 421 and second 422 housing portions. The carrier 430 includes one or more retainer mounts 443 configured to receive cable retainers of the optical cables as previously discussed. As indicated in FIGS. 4A and 4B, the frame 440 includes one or more ferrule supports 450 disposed at a mating end 480 of the optical connector 400. The ferrule supports 450 are configured to support the ferrules 412 of the optical cables disposed within the connector housing 420 as previously discussed. Connector 400 includes an actuator 470 that, when operated by engagement of the first 421 and second 422 housing portions, causes relative movement between the carrier 430 and frame 440. As illustrated in FIGS. 4A and 4B, the actuator 470 comprises a tapered surface 471 of the first housing portion 421 that is configured to engage with a surface 472 of the carrier 430. Engagement of the tapered surface 471 of the first housing portion 421 with the surface 472 of the carrier 430 causes the carrier 430 to move relative to the frame 440 along the axis 198 (configuration axis).

Engagement of the first housing portion 421 and the second housing portion 422 involves inserting the second housing portion into the cavity 420a of the first housing portion 421 through the opening 420b of the first housing portion 421. During engagement of the first and second housing portions 421, 422 the second housing portion 422 engages with the first housing portion 421 along longitudinal axis 196 which is substantially parallel to the mating axis 199. Interaction of the tapered surface 471 of the first housing portion 421 with the carrier surface 430a along the longitudinal (engagement) axis 196 causes the relative motion between the carrier 430 and frame 440 along configuration axis 198. As the second housing portion 422 slides into the cavity 420a of the first housing portion 421, the tapered surface 471 interacts with the surface 472 of the carrier 430 forcing the carrier 430 to move along axis 198.

The actuators 170, 470 illustrated in FIGS. 1A through 1G, 3A, 3B, 4A and 4B are operated to move the carrier 130, 430 relative to the frame 140, 440 as the first housing portion 121, 421 engages with the second housing portion 122, 422. In alternative embodiments, the operation of the actuator that causes the relative motion between carrier and the frame is independent of the engagement of the housing portions.

Figure 5B:
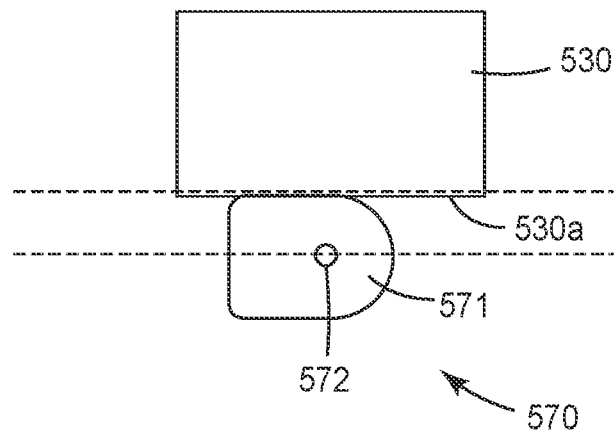
FIGS. 5B and 5C show operation of the actuator of the connector of FIG. 5A.
Figure 5C:
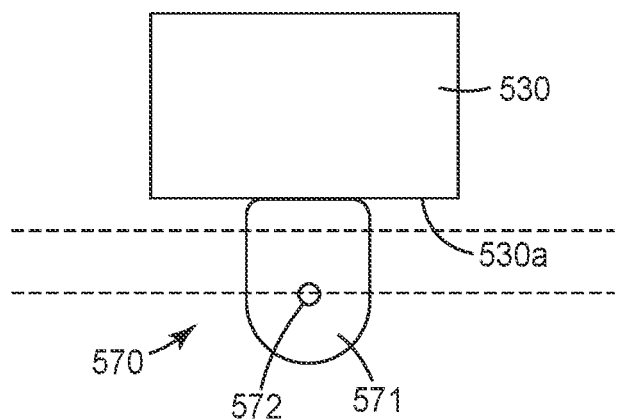

FIGS. 5A through 5C illustrate a connector 500 having actuator 570 capable of being operated independently of the engagement of the first 521 and second 522 housing portions. FIG. 5A shows an partially see through view of the first and second housing portions 521, 522 and optical cables 110. Each optical cable 110 includes an optical waveguide array 111 comprising at least one optical waveguide attached to a ferrule 112. The first and second housing portions 521, 522 can be engaged before operation of the actuator 570. The housing 520 includes a carrier 530 and frame 540. The carrier 530 includes retainer mounts 543 configured to receive and hold the cable retainers 113

In the embodiment illustrated in FIGS. 5A through 5C, the actuator 570 includes a cam 571 disposed within the housing 520 and configured to rotate around a pivot 572. Although the cam 571 is shown to be a part of the first housing portion 521 in FIG. 5A, the cam could alternatively be located on the second housing portion. Rotation of the cam 571 causes the cam 571 to engage with a surface 530a of the carrier 530, forcing the carrier 530 to move relative to the frame 540 along axis 198 (configuration axis). Movement of the carrier 530 relative to the frame 540 causes the optical waveguide array 111 to bend and the ferrules 112 to rotate. The bend 111a in the optical waveguide array 111 provides a predetermined amount of mating spring force at a predetermined angle of the ferrules 112 when the ferrules 112 are mated with a mating ferrule.

The actuators 170, 470, 570 discussed herein can be configured to be reversibly operated. Operation of the actuator 170, 470 of connectors 100, 400 occurs when the first housing portion 121, 421 engages with the second housing portion 122, 422. Operating the actuator 170, 470 of connectors 100, 300, 400, causes the carrier 130, 430 to move relative to the frame 149, 440 from an initial carrier/frame position (see FIG. 1B) to a second carrier/frame position (see FIG. 1A) which in turn causes the optical waveguide array 111, 411 to bend or bend more. Reversing the operation of the actuator 170, 470 of connectors 100, 300, 400 involves disengaging the first housing portion 121, 421 from the second housing portion 122, 422. Reversing the operation of the actuator 170, 470 causes the carrier 130, 430 and frame 140, 440 to move from the second carrier/frame position back to the initial carrier/frame position wherein the optical waveguides are in a less bent or substantially straight configuration. The optical waveguide array 111, 411 can be removed from the carrier and frame without substantial damage to the waveguide array 111, 411, the carrier 130, 430, and/or the frame 140, 440.

Operation of actuator 570 of connector 500 occurs when the cam 571 is rotated from an initial cam position (shown in FIG. 5B) to a second cam position (shown in FIG. 5C). Rotation of the cam 571 forces the carrier 530 to move relative to the frame 540 from an initial carrier/frame position where the optical waveguide array 111 is in a less bent or a substantially straight configuration to a second carrier/frame position where the optical waveguide array 511 is bent or are bent more. Reversing the operation of the actuator 570 involves rotating the cam 571 from the second cam position back to the initial cam position which allows the carrier 530 to move from the second carrier/frame position back to the initial carrier/frame position.

The actuator that causes the carrier to move relative to the frame can have actuator portions disposed on the first housing portion, the second housing portion or on both first and second housing portions. As discussed above, operation of the actuator can depend on the engagement of the first and second housing portions or can be independent of the engagement of the first and second housing portions. For example, the actuator can be operated manually via an external knob or screw head. Operation of the actuator can be reversible or irreversible. Before the actuator is operated to move the carrier relative to the frame, the carrier and the frame are adapted to allow the optical cables to be installed in and subsequently removed from the second housing portion in a substantially straight or slightly bent configuration without damage to the second housing portion and/or to the optical cables.

According to some embodiments, the optical connector 100, 300, 400, 500 includes a housing 120, 420, 520 comprising one or more waveguide support walls 131, 141, 331, 341, 431, 441, 531, 541 configured to support the optical cables 110, 410, 510. The waveguide support walls 131, 141, 431, 441, 531, 541 may disposed on the carrier 130, 430, 530 and/or the frame 140, 440, 540 of the connector housing 120, 420, 520. Each waveguide support wall 131, 141, 431, 441, 531, 541 includes a face 131c, 141c, 331c, 341c, 431c, 441c, 531c, 541c that is spaced apart from a mating face 181, 481, 581 of the optical connector 100, 300, 400, 500. The one or more waveguide support walls 131, 141, 331, 341, 431, 441, 531, 541 are configured to allow optical cables 110, 410, 510 to be inserted into the housing 120, 420, 520 along a direction substantially orthogonal to a mating axis 199 of the optical connector 100, 300, 400, 500.

As shown in FIGS. 1A, 1B, 3A, 3B, 4A, 4B, 5A, 5B each waveguide support wall 131, 141, 431, 441, 531, 541 includes at least one sloped surface 131a, 141a, 431a, 441a, 531a, 541a configured to support the optical waveguide array 111, 411, 511 of the optical cable 110, 410, 510 at a predetermined angle, θ, with respect to a mating axis 199 of the optical connector 100, 300, 400, 500. For example, the predetermined angle, θ, may be between about 15 and about 25 degrees. In some implementations, the predetermined angle is about 18 degrees. The waveguide support walls 131, 141, 431, 441, 531, 541 are adapted such that the one or more optical cables 110, 410, 510 can be installed in and subsequently removed from the carrier 130, 430, 530 and frame 140, 440, 540 without damage to the carrier 130, 430, 530, frame 140, 440, 540, and/or the optical cables 110, 410, 510.

Figure 6:
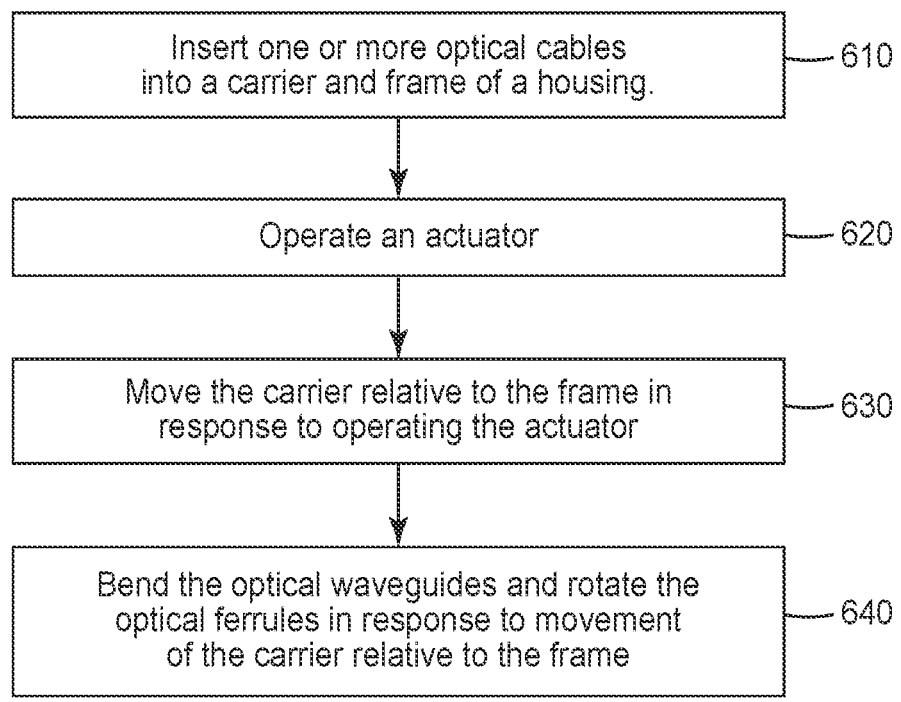
FIG. 6 is a flow diagram illustrating a method of implementing an optical connector in accordance with some embodiments.

FIG. 6 is a flow diagram of a method of implementing an optical connector in accordance with some embodiments. One or more optical cables are inserted 610 into a housing comprising a carrier and frame. Each optical cable comprises at least one optical waveguide and at least one optical ferrule attached to the waveguide. An actuator is operated 620 that moves 630 the carrier relative to the frame. In response to the relative movement between the carrier and the frame, the optical waveguide bends 640 or bends more and the ferrules rotate. The bend in the optical waveguide provides a predetermined spring force at a predetermined angle of the ferrule when the ferrule is mated with a mating ferrule.

In some embodiments, the housing includes a first housing portion and a second housing portion that comprises the carrier and the frame. Operating the actuator comprises mechanically engaging the first housing portion with the second housing portion. According to some implementations, mechanically engaging the first housing portion with the second housing portion is performed independently of operating the actuator. For example, operating the actuator may be performed after the first housing portion is fully engaged with the second housing portion. Operating the actuator can involve operating a cam or other structure that engages with a surface of the carrier; this may be done manually, for example by turning an external knob or screw head. The carrier is moved relative to the frame in response to engaging the cam with a surface of the carrier.

In some implementations, mechanically engaging the first housing portion and the second housing portion comprises moving one or both of the first housing portion and the second housing portion along a lateral axis substantially orthogonal to a mating axis of the optical connector. In some implementations, mechanically engaging the first housing portion and the second housing portion comprises rotating one or both of the first housing portion and the second housing portion around a vertical axis substantially orthogonal to a mating axis of the optical connector. In other implementations mechanically engaging the first housing portion and the second housing portion comprises rotating one or both of the first housing portion and the second housing portion around a longitudinal axis substantially parallel to a mating axis of the optical connector. In yet other implementations, mechanically engaging the first housing portion and the second housing portion comprises moving one or both of the first and second housing portions along a longitudinal axis substantially parallel to a mating axis of the optical connector.

According to some versions of the method, multiple optical cables can be inserted into the housing simultaneously. In these versions, the multiple optical cables may comprise a common cable retainer. Alternatively, each optical cable can have a separate cable retainer and/or can be separately inserted into the housing. Inserting the optical cables can involve inserting the cable retainer into a retainer mount of the frame. In some embodiments, each optical cable is attached to a corresponding cable retainer. According to some versions of the method, the optical cables can be inserted into the carrier and attached to the carrier. Subsequently, the carrier is inserted into the second housing portion.

The connector structures herein are configured such that the one or more optical cables are inserted into the carrier and the frame while the optical cables are substantially straight or are slightly bend. The optical cables are inserted into the carrier and the frame along a first insertion axis. For example, the first insertion axis may be substantially orthogonal or may be substantially parallel to a mating of the optical connector. According to some embodiments, the first insertion axis is a longitudinal axis substantially parallel to a mating axis of the optical connector. In some implementations, insertion the optical cables may involve inserting the optical cables along multiple orthogonal axes. After insertion of the optical cables into the carrier and frame, the actuator is operated which causes the carrier to move relative to the frame along a configuration axis. According to some embodiments the configuration axis is substantially orthogonal to at least one of the insertion axes.

Embodiments disclosed herein include;

Embodiment 1. An optical connector comprising:
one or more optical cables, each optical cable comprising an array of at least one optical waveguide and at least one optical ferrule attached to the array of optical waveguides; and a housing comprising:
a first housing portion; and
a second housing portion engaged with the first housing portion, the second housing portion comprising at least one carrier and a frame, the carrier and frame of the second housing portion configured to support the one or more optical cables, the first housing portion and the second housing portion configured such that mechanical engagement of the first housing portion with the second housing portion moves the carrier relative to the frame, movement of the carrier relative to the frame causing a bend in each optical waveguide and rotation of each ferrule, the bend providing a predetermined spring force of the optical waveguide at a predetermined angle of the ferrule.

Embodiment 2. The optical connector of embodiment 1, wherein the one or more optical cables are attached to the carrier by adhesive.

Embodiment 3. The optical connector of embodiment 1, wherein the optical cables are attached to the carrier by a friction grip.

Embodiment 4. The optical connector of any of embodiments 1 through 3, wherein there is one carrier per frame.

Embodiment 5. The optical connector of any of embodiments 1 through 3, wherein there are multiple carriers per frame.

Embodiment 6. The optical connector of any of embodiments 1 through 5, wherein there are multiple frames per connector;

Embodiment 7. The optical connector of any of embodiments 1 through 6, wherein:
at least one cable retainer is attached to the array of waveguides of the one or more optical cables and spaced apart from ferrules of the optical cables; and the carrier includes at least one retainer mount configured to receive the at least one cable retainer.

Embodiment 8. The optical connector of embodiment 7, wherein the at least one cable retainer is a single cable retainer attached to the waveguides of each of the multiple optical cables.

Embodiment 9. The optical connector of embodiment 7, wherein:
the at least one cable retainer comprises multiple cable retainers; and
the one or more optical cables comprises multiple optical cables, wherein each of the multiple cable retainers is respectively attached to the at least one waveguide of one of the multiple optical cables.

Embodiment 10. The optical connector of embodiment 7, wherein the optical cables are attached to the cable retainer by adhesive.

Embodiment 11. The optical connector of embodiment 7, wherein the optical cables are attached to the cable retainer by a friction grip.

Embodiment 12. The optical connector of any of embodiments 1 through 11, wherein; the one or more optical cables includes multiple optical cables, each optical cable comprising a cable retainer attached to the array of waveguides of the optical cable and spaced apart from the ferrule of the optical cable; and the carrier includes multiple retainer mounts, each retainer mount configured to receive a corresponding cable retainer of the multiple optical cables.

Embodiment 13. The optical connector of any of embodiments 1 through 12, wherein the at least one optical waveguide array comprises at least one optical fiber.

Embodiment 14. The optical connector of any of embodiments 1 through 12, wherein the at least one optical waveguide array comprises multiple optical fibers.

Embodiment 15. The optical connector of any of embodiments 1 through 12, wherein the at least one optical waveguide array comprises at least one planar waveguide disposed on a substrate.

Embodiment 16. The optical connector of any of embodiments 1 through 12, wherein the at least one optical waveguide array comprises multiple planar waveguides disposed on a substrate.

Embodiment 17. The optical connector of any of embodiments 1 through 16, wherein the frame includes one or more ferrule supports disposed at a mating end of the optical connector, the ferrule supports configured to support the ferrules of the optical cables.

Embodiment 18. The optical connector of any of embodiments 1 through 17, wherein the one or more optical cables includes at least four optical cables, the optical cables extending along a longitudinal axis of the connector and stacked within the connector housing along a vertical axis different from the longitudinal axis.

Embodiment 19. The optical connector of any of embodiments 1 through 18, wherein the frame includes one or more frame waveguide support walls disposed between a mating end of the optical connector and the carrier, each frame waveguide support wall configured to support a corresponding optical waveguide.

Embodiment 20. The optical connector of embodiment 19, wherein each frame waveguide support wall includes a sloped portion that supports the optical waveguide such that the optical waveguide makes a predetermined angle with respect to a mating axis of the optical connector.

Embodiment 21. The optical connector of embodiment 20, wherein the predetermined angle is between 15 and 25 degrees.

Embodiment 22. The optical connector of embodiment 20, wherein the predetermined angle is about 18 degrees.

Embodiment 23. The optical connector of any of embodiments 1 through 22, wherein the carrier includes one or more carrier waveguide support walls disposed between a mating end of the optical connector and a retainer mount of the carrier, each carrier waveguide support wall configured to support a corresponding optical waveguide.

Embodiment 24. The optical connector of embodiment 23, wherein each carrier waveguide support wall includes a sloped portion that supports the optical waveguide such that the optical waveguide makes a predetermined angle with respect to a mating axis of the optical connector.

Embodiment 25. The optical connector of embodiment 24, wherein the predetermined angle is between 15 and 25 degrees.

Embodiment 26. The optical connector of embodiment 24, wherein the predetermined angle is about 18 degrees.

Embodiment 27. The optical connector of any of embodiments 1 through 26, wherein before engagement of the first and second housing portions, the carrier and the frame are adapted to allow the optical cables to be installed in and subsequently removed from the carrier and the frame without damage to the carrier, frame or the optical cables.

Embodiment 28. The optical connector of any of embodiments 1 through 27, wherein:
the housing is configured to allow insertion of the optical cables into the carrier and the frame before engagement of the first housing portion and the second housing portion while waveguides of the optical cables are substantially straight or slightly bent; and
mechanical engagement of the first housing portion with the second housing portion causes the waveguides to bend or to bend more.

Embodiment 29. The optical connector of any of embodiments 1 through 28, wherein:

the second housing portion is configured to allow insertion of the optical cables into the carrier and the frame along at least a first insertion axis; and the first housing portion and the second housing portion are configured such that mechanical engagement of the first housing portion with the second housing portion causes the carrier to move relative to the frame along a configuration axis.

Embodiment 30. The optical connector of embodiment 29, wherein the first insertion axis is a lateral axis substantially orthogonal to a mating axis of the optical connector.

Embodiment 31. The optical connector of embodiment 29, wherein the configuration axis is a vertical axis substantially perpendicular to a mating axis of the optical connector.

Embodiment 32. The optical connector of embodiment 29, wherein the second housing portion is configured to allow insertion of the optical cables into the carrier and the frame along the first insertion axis and along a second insertion axis that is substantially orthogonal to the first insertion axis.

Embodiment 33. The optical connector of embodiment 32, wherein the first insertion axis is a lateral axis substantially orthogonal to a mating axis of the optical connector and the second insertion axis is a longitudinal axis substantially parallel to a mating axis of the optical connector.

Embodiment 34. The optical connector of embodiment 29, wherein the configuration axis is substantially orthogonal to the first insertion axis.

Embodiment 35. The optical connector of embodiment 29, wherein the configuration axis is a vertical axis substantially orthogonal to the mating axis.

Embodiment 36. The optical connector of any of embodiments 1 through 35, wherein:

the frame and the carrier are configured to allow insertion of the optical cable into the frame and the carrier along a first insertion axis and a second insertion axis orthogonal to the first insertion axis before mechanical engagement of the first housing portion and the second housing portion; and mechanical engagement of the first housing portion with the second housing portion causes the carrier to move relative to the frame along a configuration axis that is different from the first insertion axis and the second insertion axis.

Embodiment 37. The optical connector of embodiment 36, wherein:

the first insertion axis is a lateral axis substantially orthogonal to a mating axis of the optical connector;

the second insertion axis is a longitudinal axis substantially parallel to the mating axis of the optical connector; and the configuration axis is a third axis substantially orthogonal to the mating axis.

Embodiment 38. The optical connector of any of embodiments 1 through 37, wherein the first housing portion and the second housing portion are configured such that mechanical engagement of the first housing portion with the second housing portion includes relative movement between the first housing portion and the second housing portion along at least a first engagement axis.

Embodiment 39. The optical connector of embodiment 38, wherein the engagement axis is a longitudinal axis substantially parallel to a mating axis of the optical connector.

Embodiment 40. The optical connector of embodiment 38, wherein the engagement axis is a lateral axis substantially orthogonal to a mating axis of the optical connector.

Embodiment 41. The optical connector of any of embodiments 1 through 40, wherein the first housing portion and the second housing portion are configured such that mechanical engagement of the first and second housing portions includes rotational movement of the first housing portion and the second housing portion around a rotational engagement axis.

Embodiment 42. The optical connector of embodiment 41, wherein the rotational axis is a vertical axis substantially orthogonal to a mating axis of the optical connector.

Embodiment 43. The optical connector of embodiment 41, wherein the rotational axis is a longitudinal axis substantially parallel to a mating axis of the optical connector.

Embodiment 44. An optical connector comprising:

one or more optical cables each optical cable comprising an array of at least one optical waveguide and at least one optical ferrule attached to the array of optical waveguides;

a housing comprising at least one carrier and a frame, the carrier and the frame configured to support the one or more optical cables; and an actuator configured such that operation of the actuator causes relative motion between the carrier and the frame, the relative motion between the carrier and the frame causing a bend in the optical waveguide and rotation of the ferrule, the bend providing a predetermined spring force of the waveguide at a predetermined angle of the ferrule with respect to a mating axis of the optical connector.

Embodiment 45. The optical connector of embodiment 44, wherein the housing includes a first housing portion and a second housing portion engaged with the first housing portion, the second housing portion comprising the carrier and the frame.

Embodiment 46. The optical connector of embodiment 45, wherein the actuator is configured such that operation of the actuator occurs as the first housing portion mechanically engages with the second housing portion.

Embodiment 47. The optical connector of claim 45, wherein the actuator is configured to be operated independently from mechanical engagement of the first housing portion with the second housing portion.

Embodiment 48. The optical connector of embodiment 45, wherein the actuator is configured to be manually operated after engagement of the first housing portion with the second housing portion.

Embodiment 49. The optical connector of embodiment 45, wherein the actuator is configured to be reversibly operated such that reverse operation of the actuator straightens the bend in the optical waveguide.

Embodiment 50. The optical connector of embodiment 45, wherein the actuator is disposed on the first housing portion, the second housing portion, or on both the first and the second housing portions.

Embodiment 51. The optical connector of embodiment 45, wherein at least a portion of the actuator is disposed on the carrier.

Embodiment 52. The optical connector of embodiment 45, wherein at least a portion of the actuator is disposed on the frame.

Embodiment 53. The optical connector of any of embodiments 44 through 52, wherein before operation of the actuator the carrier and the frame are adapted to allow the optical cables to be installed in and subsequently removed from the second housing portion without damage to the second housing portion and the optical cables.

Embodiment 54. The optical connector of any of embodiments 44 through 53, wherein:
- the second housing portion is configured to allow insertion of the optical cables into the carrier and the frame along at least a first insertion axis; and
- the actuator is configured such that operation of the actuator causes the carrier to move relative to the frame along a configuration axis.

Embodiment 55. The optical connector of embodiment 54, wherein the configuration axis is substantially orthogonal to the first insertion axis.

Embodiment 56. The optical connector of embodiment 54, wherein the first insertion axis is a lateral axis substantially orthogonal to a mating axis of the optical connector.

Embodiment 57. The optical connector of embodiment 54, wherein the first insertion axis is a longitudinal axis substantially parallel to a mating axis of the optical connector.

Embodiment 58. The optical connector of embodiment 54, wherein the configuration axis is a vertical axis substantially orthogonal to a mating axis of the optical connector.

Embodiment 59. The optical connector of embodiment 54, wherein the configuration axis is a longitudinal axis (196) substantially parallel to a mating axis of the optical connector.

Embodiment 60. The optical connector of embodiment 54, wherein the second housing portion is configured to allow insertion of the optical cables into the carrier and the frame along the first insertion axis and along a second insertion axis.

Embodiment 61. The optical connector of embodiment 60, wherein the first insertion axis is a lateral axis substantially orthogonal to a mating axis of the optical connector and the second insertion axis is a longitudinal axis substantially parallel to the mating axis.

Embodiment 62. The optical connector of any of embodiments 44 through 61, wherein:
- the carrier and the frame are configured to allow insertion of the optical cables into the frame and the carrier along a first insertion axis and a second insertion axis orthogonal to the first insertion axis before the mechanical engagement of the first housing portion and the second housing portion; and
- the actuator is configured such that operation of the actuator causes the carrier to move relative to the frame along a configuration axis.

Embodiment 63. The optical connector of embodiment 62, wherein:
- the first insertion axis is a lateral axis substantially orthogonal to a mating axis of the optical connector and the second insertion axis is a longitudinal axis substantially parallel to the mating axis of the optical connector; and
- the first configuration axis is a vertical axis substantially orthogonal to the mating axis.

Embodiment 64. The optical connector of any of embodiments 44 through 63, wherein:
- the housing includes a first housing portion engaged with a second housing portion that includes the carrier and the frame; and
- the actuator comprises a rib disposed on the first housing portion, the rib configured to interact with a surface of the carrier to cause the relative motion between the carrier and the frame during mechanical engagement of the first housing portion and the second housing portion.

Embodiment 65. The optical connector of embodiment 64, wherein the rib includes an inclined surface.

Embodiment 66. The optical connector of embodiment 65, wherein the surface of the carrier includes an inclined surface that is complementary to the inclined surface of the rib.

Embodiment 67. The optical connector of any of embodiments 44 through 66, wherein:
- the housing includes a first housing portion engaged with a second housing portion that includes the carrier and the frame; and
- the actuator comprises a surface of the carrier, the surface configured to interact with a rib of the first housing portion to cause the relative motion between the carrier and the frame during mechanical engagement of the first housing portion and the second housing portion.

Embodiment 68. The optical connector of any of embodiments 44 through 66, wherein the actuator comprises a tapered surface of the first housing portion and a surface of the carrier, wherein engagement of the tapered surface of the first housing portion with the surface of the carrier causes relative motion between the carrier and the frame.

Embodiment 69. The optical connector of any of embodiments 44 through 66, wherein the actuator comprises a cam disposed in the housing and a surface of the carrier, wherein engagement of the cam with the surface of the carrier causes the relative motion between the carrier and the frame.

Embodiment 70. An optical connector comprising:
- one or more optical cables, each optical cable comprising am array of at least one optical waveguide and at least one optical ferrule attached to the optical waveguide; and
- a housing that includes one or more waveguide support walls, each waveguide support wall configured to allow the optical cables to be inserted into the housing when waveguides of the optical cables are in a substantially straight configuration, each waveguide support wall having a sloped surface to support the waveguides at a predetermined angle to a mating axis of the optical connector after the waveguides bend within the housing.

Embodiment 71. The optical connector of embodiment 70, wherein the predetermined angle is between about 15 and about 25 degrees.

Embodiment 72. The optical connector of embodiment 70, wherein the predetermined angle is about 18 degrees.

Embodiment 73. The optical connector of any of embodiments 70 through 72, wherein the waveguide support walls are adapted such that the one or more optical cables can be installed in and subsequently removed from the frame without damage to the frame or the optical cables.

Embodiment 74. The optical connector of any of embodiments 70 through 73, wherein the housing includes a carrier and a frame configured to move relative to one another, movement of the carrier relative to the frame causing the waveguides to bend.

Embodiment 75. The optical connector of embodiment 74, wherein the waveguide support walls are disposed in one or both of the carrier and the frame.

Embodiment 76. The optical connector of embodiment 74, wherein the waveguide support walls include one or more waveguide support walls on the carrier.

Embodiment 77 The optical connector of embodiment 74, wherein the waveguide support walls include one or more waveguide support walls on the frame.

Embodiment 78. The optical connector of claim 74, wherein:

each optical cable includes a cable retainer spaced apart from the ferrule and attached to the waveguide; and the carrier includes at least one retainer mount configured to receive the cable retainer.

Embodiment 79. The optical connector of embodiment 78, wherein:

the housing includes a carrier and a frame configured to move relative to one another; and the retainer mount is disposed in the carrier such that movement of the carrier relative to the frame causes the waveguides to bend.

Embodiment 80. The optical connector of any of embodiments 70 through 79, wherein the housing comprises:

a first housing portion; and a second housing portion engaged with the first housing portion, the second housing portion comprising a carrier and the frame configured to move relative to one another, engagement of the first housing portion with the second housing portion causing the relative movement of the carrier and the frame, the relative movement of the carrier and the frame causing the waveguides to bend within the housing.

Embodiment 81. The optical connector of any of embodiments 70 through 80, wherein each waveguide support wall includes a face that is spaced apart from a mating face of the optical connector.

Embodiment 82. An optical connector comprising:

one or more optical cables, each optical cable comprising an array of at least one optical waveguide and at least one optical ferrule attached to the optical waveguide array; and a housing comprising one or more waveguide support walls configured to support the optical cables, the one or more waveguide support walls configured to allow the optical cables to be inserted into the housing along a direction substantially orthogonal to a mating axis of the optical connector.

Embodiment 83. The optical connector of embodiment 82, wherein each waveguide support wall includes a sloped surface configured to support the optical waveguide of the optical cable at a predetermined angle with respect to a mating axis of the optical connector.

Embodiment 84. The optical connector of any of embodiments 82 through 83, wherein the housing includes a carrier and a frame configured to move relative to one another and one or both of the carrier and the frame include the waveguide support walls.

Embodiment 85. The optical connector of embodiment 84, wherein the one or more waveguide support walls are configured to allow the optical cables to be inserted into the carrier and frame in a substantially straight or slightly bent configuration and relative movement between the carrier and the frame causes the optical waveguides to bend or to bend more.

Embodiment 86. An optical cable comprising:

An array of at least one optical waveguide having a longitudinal axis;

at least one optical ferrule attached to the array of optical waveguides; and a cable retainer attached to the optical waveguide and spaced apart from the ferrule, wherein when the optical waveguide is held by the cable retainer so that the portion of the optical waveguide at the cable retainer is horizontally straight with respect to gravity, the portion of the optical waveguide at the ferrule sags by less than a predetermined percentage, x %, of a distance, d, between the cable retainer and the optical ferrule.

Embodiment 87. The optical cable of embodiment 86, wherein the x % is about 20%.

Embodiment 88. The optical cable of embodiment 86, wherein x % is about 10%.

Embodiment 89. The optical cable of embodiment 86, wherein x % is about 5%.

Embodiment 90. The optical cable of embodiment 86, wherein x % is about 1%.

Embodiment 91. The optical cable of embodiment 86, wherein the distance is about 4 cm.

Embodiment 92. The optical cable of embodiment 86, wherein the distance is about 1.8 cm.

Embodiment 93. The optical cable of embodiment 86, wherein the at least one optical waveguide comprises an optical fiber.

Embodiment 94. The optical cable of embodiment 86, wherein the at least one optical waveguide comprises a waveguide array of multiple optical fibers.

Embodiment 95. The optical cable of embodiment 86, wherein the at least one optical waveguide comprises at least one planar waveguide disposed on a substrate.

Embodiment 96. The optical cable of embodiment 86, wherein the at least one optical waveguide comprises multiple planar waveguides disposed on a substrate.

Embodiment 97. A method of assembling an optical connector comprising:

inserting one or more optical cable into housing comprising a carrier and frame, each optical cable comprising at least one optical waveguide and at least one optical ferrule;

operating an actuator;

moving the carrier relative to the frame in response to operating the actuator; and bending the optical waveguide and rotating the ferrule in response to movement of the carrier relative to the frame, the bending of the optical waveguide providing a predetermined spring force at a predetermined angle of the ferrule.

Embodiment 98. The method of embodiment 97, wherein:

the housing includes a first housing portion and a second housing portion that comprises the frame and the actuator; and operating the actuator comprises mechanically engaging the first housing portion with the second housing portion.

Embodiment 99. The method of any of embodiments 97 through 98, wherein:

the housing portion includes a first housing portion and a second housing portion that comprises the frame and the actuator; and the method further comprising:

mechanically engaging the first housing portion with the second housing portion; and after mechanically engaging the first housing portion with the second housing portion, operating the actuator.

Embodiment 100. The method of embodiment 99, wherein mechanically engaging the first housing portion and the second housing portion comprises moving one or both of the first housing portion and the second housing portion along a lateral axis substantially orthogonal to a mating axis of the optical connector.

Embodiment 101. The method of embodiment 99, wherein mechanically engaging the first housing portion and the second housing portion comprises rotating one or both of the first housing portion and the second housing portion around a vertical axis substantially orthogonal to a mating axis of the optical connector.

Embodiment 102. The method of embodiment 99, wherein mechanically engaging the first housing portion and the second housing portion comprises rotating one or both of the first housing portion and the second housing portion around a longitudinal axis substantially parallel to a mating axis of the optical connector.

Embodiment 103. The method of embodiment 99, wherein mechanically engaging the first housing portion and the second housing portion comprises moving one or both of the first and second housing portions along a longitudinal axis substantially parallel to a mating axis of the optical connector.

Embodiment 104. The method of any of embodiments 97 through 103, wherein:
the housing includes a first housing portion and a second housing portion that comprises the carrier and the frame;
operating the actuator comprises operating a cam that engages with a surface of the carrier; and
moving the carrier relative to the frame comprises moving the carrier relative to the frame in response to engaging the cam with a surface of the carrier.

Embodiment 105. The method of any of embodiments 97 through 104, wherein inserting the one or more optical cables comprises simultaneously inserting multiple optical cables.

Embodiment 106. The method of any of embodiments 97 through 105, wherein:
each optical cable includes a cable retainer attached to the waveguides; and
inserting the one or more optical cables comprises inserting the cable retainer into a retainer mount of the frame.

Embodiment 107. The method of embodiment 106, wherein one cable retainer is attached to multiple arrays of optical waveguides, each array of optical waveguides attached to a corresponding optical ferrule.

Embodiment 108 The method of any of embodiments 97 through 107, wherein inserting the one or more optical cables comprises:
inserting the optical cables into the carrier; and
subsequently inserting the carrier into the frame.

Embodiment 109. The method of any of embodiments 97 through 108, further comprising removing the one or more optical cables from the housing without damage to the housing or the optical cables.

Embodiment 110. The method of any of embodiments 97 through 109, wherein inserting the one or more optical cables comprises inserting the one or more optical cables into the carrier and the frame while the optical waveguides are substantially straight or are slightly bent.

Embodiment 111. The optical connector of any of embodiments 97 through 110, wherein:
inserting the optical cables comprises inserting the optical cables into the carrier and the frame along at least a first insertion axis; and
moving the carrier relative to the frame in response to operating the actuator comprises moving the carrier relative to the frame along a configuration axis orthogonal to the first insertion axis.

Embodiment 112. The optical connector of embodiment 111, wherein the first insertion axis is a lateral axis substantially orthogonal to a mating of the optical connector.

Embodiment 113. The optical connector of embodiment 111, wherein the first insertion axis is a longitudinal axis substantially parallel to a mating axis of the optical connector.

Embodiment 114. The optical connector of embodiment 111, wherein inserting the optical cables comprises inserting the optical cables into the carrier and the frame along the first insertion axis and along a second insertion axis, wherein the first insertion axis is a lateral axis that is substantially orthogonal to a mating axis of the optical connector and the second insertion axis is a longitudinal axis that is substantially parallel to the mating axis.

Embodiment 115. The optical connector of embodiment 111, wherein the configuration axis is a vertical axis substantially orthogonal to a mating axis of the optical connector.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A method of assembling an optical connector configured for mating with another connector, the method comprising:
inserting one or more optical cables into housing comprising a carrier and frame, each optical cable comprising at least one optical waveguide and at least one optical ferrule;
operating an actuator;
moving the carrier relative to the frame in response to operating the actuator; and
bending the optical waveguide and rotating the ferrule in response to movement of the carrier relative to the frame, the bending of the optical waveguide providing a predetermined spring force at a predetermined angle of the ferrule.

2. The method of claim 1, wherein:
the housing includes a first housing portion and a second housing portion that comprises the frame and the actuator; and
operating the actuator comprises mechanically engaging the first housing portion with the second housing portion.

3. The method of claim 1, wherein:
the housing portion includes a first housing portion and a second housing portion that comprises the frame and the actuator; and
the method further comprising:

mechanically engaging the first housing portion with the second housing portion; and after mechanically engaging the first housing portion with the second housing portion, operating the actuator.

4. The method of claim 3, wherein mechanically engaging the first housing portion and the second housing portion comprises moving one or both of the first housing portion and the second housing portion along a lateral axis substantially orthogonal to a mating axis of the optical connector.

5. The method of claim 3, wherein mechanically engaging the first housing portion and the second housing portion comprises rotating one or both of the first housing portion and the second housing portion around a vertical axis substantially orthogonal to a mating axis of the optical connector.

6. The method of claim 3, wherein mechanically engaging the first housing portion and the second housing portion comprises rotating one or both of the first housing portion and the second housing portion around a longitudinal axis substantially parallel to a mating axis of the optical connector.

7. The method of claim 3, wherein mechanically engaging the first housing portion and the second housing portion comprises moving one or both of the first and second housing portions along a longitudinal axis substantially parallel to a mating axis of the optical connector.

8. The method of claim 1, wherein:
the housing includes a first housing portion and a second housing portion that comprises the carrier and the frame;
operating the actuator comprises operating a cam that engages with a surface of the carrier; and
moving the carrier relative to the frame comprises moving the carrier relative to the frame in response to engaging the cam with a surface of the carrier.

9. The method of claim 1, wherein inserting the one or more optical cables comprises simultaneously inserting multiple optical cables.

10. The method of claim 1, wherein:
each optical cable includes a cable retainer attached to the waveguides; and
inserting the one or more optical cables comprises inserting the cable retainer into a retainer mount of the frame.

11. The method of claim 10, wherein one cable retainer is attached to multiple arrays of optical waveguides, each array of optical waveguides attached to a corresponding optical ferrule.

12. The method of claim 1, wherein inserting the one or more optical cables comprises:
inserting the optical cables into the carrier; and
subsequently inserting the carrier into the frame.

13. The method of claim 1, further comprising removing the one or more optical cables from the housing without damage to the housing or the optical cables.

14. The method of claim 1, wherein inserting the one or more optical cables comprises inserting the one or more optical cables into the carrier and the frame while the optical waveguides are substantially straight or are slightly bent.

15. The method of claim 1, wherein:
inserting the optical cables comprises inserting the optical cables into the carrier and the frame along at least a first insertion axis; and
moving the carrier relative to the frame in response to operating the actuator comprises moving the carrier relative to the frame along a configuration axis orthogonal to the first insertion axis.

16. The method of claim 15, wherein the first insertion axis is a lateral axis substantially orthogonal to a mating of the optical connector.

17. The method of claim 15, wherein the first insertion axis is a longitudinal axis substantially parallel to a mating axis of the optical connector.

18. The method of claim 15, wherein inserting the optical cables comprises inserting the optical cables into the carrier and the frame along the first insertion axis and along a second insertion axis, wherein the first insertion axis is a lateral axis that is substantially orthogonal to a mating axis of the optical connector and the second insertion axis is a longitudinal axis that is substantially parallel to the mating axis.

19. The method of claim 15, wherein the configuration axis is a vertical axis substantially orthogonal to a mating axis of the optical connector.

* * * * *